United States Patent
Wingo et al.

(10) Patent No.: US 11,843,143 B2
(45) Date of Patent: Dec. 12, 2023

(54) SUSTAINABLE ENERGY DELIVERY SYSTEM, CONTROLLER, AND METHOD

(71) Applicant: EQT Corporation, Pittsburgh, PA (US)

(72) Inventors: Robert R. Wingo, Pittsburgh, PA (US); William E. Jordan, Pittsburgh, PA (US); Toby Z. Rice, Pittsburgh, PA (US); Ryan Kanto, Pittsburgh, PA (US)

(73) Assignee: EQT CORPORATION, Pittsburgh, PA (US)

( * ) Notice: Subject to any disclaimer, the term of this patent is extended or adjusted under 35 U.S.C. 154(b) by 0 days.

(21) Appl. No.: 18/075,397

(22) Filed: Dec. 5, 2022

(65) Prior Publication Data
US 2023/0178773 A1 Jun. 8, 2023

Related U.S. Application Data

(60) Provisional application No. 63/285,713, filed on Dec. 3, 2021.

(51) Int. Cl.
| | |
|---|---|
| *H01M 8/04746* | (2016.01) |
| *H01M 8/04089* | (2016.01) |
| *H01M 8/04082* | (2016.01) |
| *H01M 8/04992* | (2016.01) |
| *G05D 7/06* | (2006.01) |
| *H04W 88/02* | (2009.01) |

(52) U.S. Cl.
CPC ...... *H01M 8/04753* (2013.01); *G05D 7/0623* (2013.01); *H01M 8/04089* (2013.01); *H01M 8/04201* (2013.01); *H01M 8/04992* (2013.01); *H01M 2250/10* (2013.01); *H04W 88/02* (2013.01)

(58) Field of Classification Search
CPC ......... H01M 8/04753; H01M 8/04089; H01M 8/04201; H01M 8/04992; H01M 2250/10; H01M 8/04955; G05D 7/0623; H04W 88/02; Y02E 60/50
See application file for complete search history.

(56) References Cited

U.S. PATENT DOCUMENTS

| | | | |
|---|---|---|---|
| 7,887,958 B2 * | 2/2011 | LaVen | H01M 8/04089 429/408 |
| 8,814,983 B2 | 8/2014 | McAlister | |
| 2007/0138006 A1 * | 6/2007 | Oakes | B60L 58/30 204/266 |
| 2013/0216457 A1 * | 8/2013 | McAlister | H01M 8/04201 423/210 |
| 2022/0052361 A1 * | 2/2022 | Morrison | B60L 50/72 |
| 2022/0118215 A1 * | 4/2022 | Teran | B01D 53/1475 |

FOREIGN PATENT DOCUMENTS

CN 108400358 A 8/2018

OTHER PUBLICATIONS

Pravin, P. S. et al., "Dynamic Modeling and Control of an Integrated Reformer-Membrane-Fuel Cell System", Processes, 2018, vol. 6, No. 169, pp. 1-25.
Clean Energy Transition Department for Energy and Mining Government of South Australia, "Hydrogen in the Gas Distribution Networks", 2019, pp. 1-149.
Habib, R. et al., "On the Response of Ultralean Combustion of CH4/H2 Blends in a Porous Burner to Fluctuations in Fuel Flow—an Experimental Investigation", Energy Fuels, May 4, 2021, vol. 35, pp. 8909-8921.
International Search Report and Written Opinion dated Apr. 14, 2023, in corresponding International Application No. PCT/US2022/051826, 9 pp.

* cited by examiner

*Primary Examiner* — Muhammad S Siddiquee
(74) *Attorney, Agent, or Firm* — XSENSUS LLP

(57) ABSTRACT

An integrated low-carbon energy system includes a controller configured to control an amount of H2 gas added to pipe-based delivery system that carries mixture of a fossil fuel in gaseous form with the H2 gas as a minority component by volume, an H2-compatible fuel cell that converts the mixed gas into electricity, a data interface that receives an H2 allocation request signal on behalf of a facility that receives electricity produced by the H2-compatible fuel cell, wherein in response to the H2 allocation request signal, the controller is configured to control a change an addition rate of H2 from a first level to a second level that corresponds with a level requested in the request signal.

15 Claims, 15 Drawing Sheets

H2 Credit Obligation

| Week | kWh Obligation | Actual Use | Delta (kWh) | Scheduled |
|---|---|---|---|---|
| Nov 1 | 100 kWh | 60 kWh | -40 | |
| Nov 8 | 100 kWh | 115 kWh | -25 (=-40+15) | |
| Nov 15 | 100 kWh | | | 125 |
| Nov 22 | 100 kWh | | | 100 |
| Nov 29 | 100 kWh | | | 100 |

Fig. 6

Expected Demand

| Hour | House | Vehicle | Co-op | Running Total |
|------|-------|---------|-------|---------------|
| 8AM | 2 kWh | 0 kWh | 2 kWh | 4 kWh |
| 9AM | 4 kWh | 0 kWh | 2 kWh | 8 kWh |
| ... | ... | | | ... |
| 2AM | 0.5 kWh | 0.5 kWh | 0 kWh | 9 kWh |
| 3AM | 0.5 kWh | 0.5 kWh | 0 kWh | 10 kWh |

Fig. 7

| Hour | Supply Sources | | | Running Total |
| --- | --- | --- | --- | --- |
| | Stored | Renewable | H2-based | |
| 8AM | 2 kWh | 1 kWh | 0 kWh | 3 kWh |
| 9AM | 2 kWh | 2 kWh | 0 kWh | 7 kWh |
| ... | ... | | | ... |
| 2AM | 4 kWh | 0 kWh | 1 kWh | 2 kWh |
| 3AM | 3 kWh | 0 kWh | 1 kWh | 3 kWh |

Fig. 8

SUSTAINABLE ENERGY DELIVERY SYSTEM, CONTROLLER, AND METHOD

RELATED APPLICATION DATA

This application claims the benefit of the earlier filing date of U.S. Provisional Patent Application No. 63/285,713 entitled "INTEGRATED LOW-CARBON ENERGY SYSTEM, METHOD, AND COMPUTER PROGRAM PRODUCT," filed Dec. 3, 2021. The disclosure of the aforementioned provisional patent application is incorporated herein by reference in its entirety.

FIELD OF THE DISCLOSURE

The present disclosure relates to sustainable energy and more particularly to techniques for distributing a fuel blend that reflects a user-requested blend amount from which electrical current is obtained via chemical reactions that produce a greenhouse gas from a majority component of the fuel blend and that produces no greenhouse gas from a minority component of the fuel blend. The techniques described herein further include sequestering the greenhouse gas produced by the chemical reactions from atmospheric emission.

BACKGROUND

There are grave concerns over the continued use of fossil fuels and other greenhouse gas (GHG) emitters in view of considerable evidence of climate change. Consequently, substantial financial, engineering and product development resources have been devoted towards new energy conversion techniques, among which are fuel cells that convert an energy carrying fluid, such as methane (CH4) gas, molecular hydrogen (H2) gas, etc., into usable electrical current. While there has been remarkable success in developing such fuel cells, new designs for even cleaner current generation are underway.

As recognized by the present inventors, one barrier to widespread use of H2, for example, is in its delivery to customers. One method in use is to deliver hydrogen in its liquid form by overland vehicle. However, such transport is inadequate to serve large scale H2 energy conversion. An alternative technique is described in "Blending Hydrogen into Natural Gas Pipeline Networks: A Review of the Key Issues" published by the National Renewable Energy Laboratory (NREL) in March, 2013. With H2 delivery afforded through natural gas pipes being possible, the development of techniques for exploiting such in broader sustainable energy systems are ongoing.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

SUMMARY

According to aspects of the disclosed subject matter, an integrated low-carbon energy system includes a controller configured to control an amount of H2 gas added to pipe-based delivery system that carries mixture of a fossil fuel in gaseous form with the H2 gas as a minority component by volume, an H2-compatible fuel cell that converts the mixed gas into electricity, a data interface that receives an H2 allocation request signal on behalf of a facility that receives electricity produced by the H2-compatible fuel cell, wherein in response to the H2 allocation request signal, the controller is configured to control a change of an addition rate of H2 from a first level to a second level that reflects a level requested in the request signal. The actual amount of H2 added to the stream of fossil fuel may not correspond directly with the amount requested by a single end-user, but the controller will aggregate different requested ratios of fossil fuel to H2.

The foregoing summary has been provided for purposes of general introduction and is not intended to limit the scope of the following claims. The described embodiments, together with further advantages, will be best understood by reference to the following detailed description taken in conjunction with the accompanying drawings.

BRIEF DESCRIPTION OF THE DRAWINGS

FIG. 6 is an illustration of exemplary data contained in a database held in a computer memory that associates H2-sourced electrical power obligated to a remote device and tracks actual use and differences between actual use and obligated use.

FIG. 7 is an illustration of exemplary data held in a database stored in a computer memory that includes hourly demand at an end user site.

FIG. 8 is an illustration of exemplary data held in a database stored in a computer memory that associates hourly use of electricity provided from different electricity supply sources.

DETAILED DESCRIPTION

Figure 1:
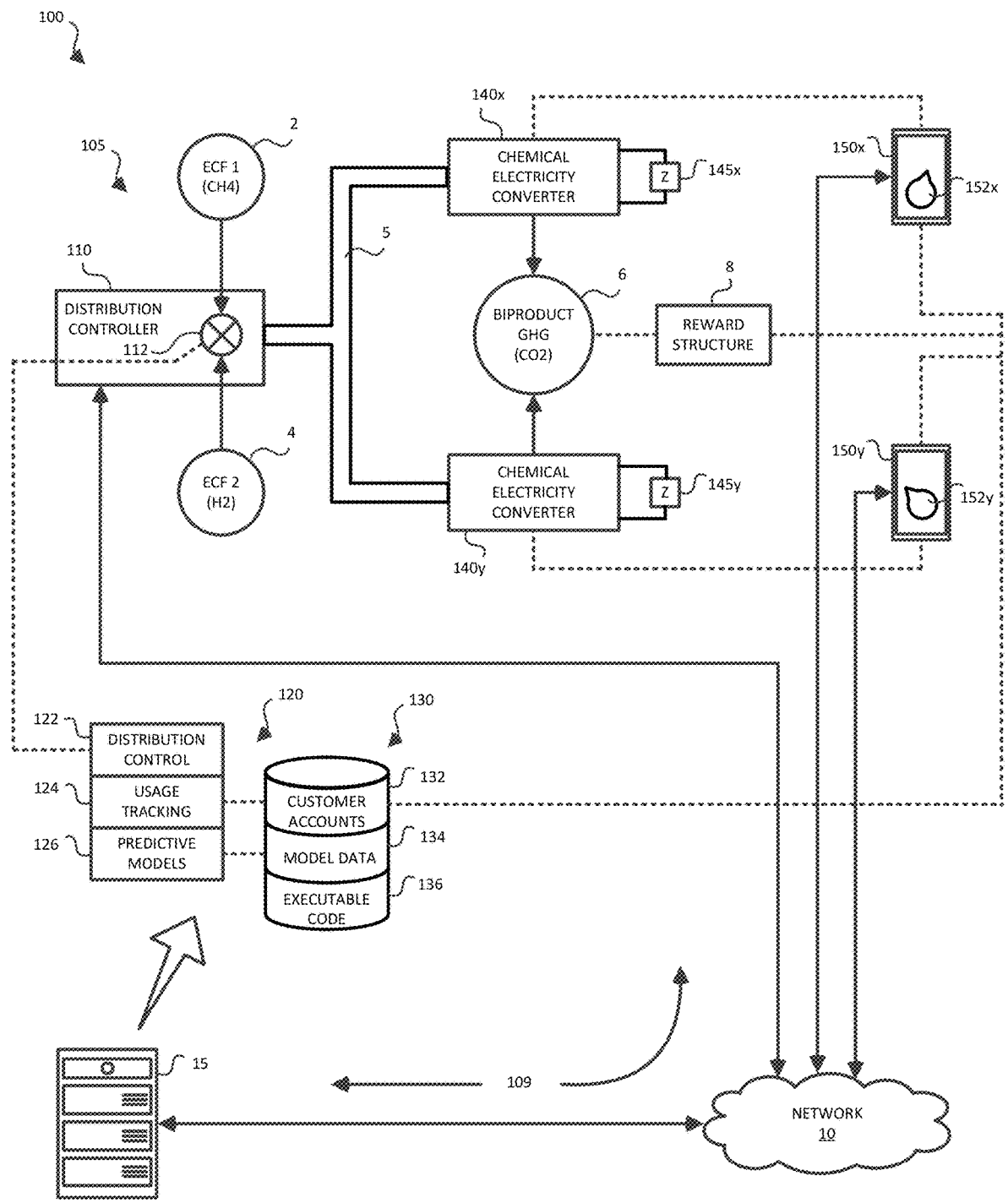
FIG. 1 is an illustration of an exemplary overview of a sustainable energy system according to one or more aspects of the disclosed subject matter.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. Moreover, the term "invention" is not to be construed as limiting the scope of any claim presented herein. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical or fluid schematics and interconnections illustrated are intended to depict signal and/or fluid flow, various interoperations between functional components and/or processes and are not necessarily direct electrical or fluid connections between such components. Moreover, the functionality illustrated and described via separate components need not be distributed as shown, and the discrete blocks in the diagrams are not necessarily intended to depict discrete electrical or fluid delivery components.

The techniques described herein are directed to sustainable energy techniques that both reduce an amount of a greenhouse gas (GHG) byproduct of electrical current generation and ameliorates emissions into the atmosphere by the amount of the GHG that remains the byproduct of the electrical current generation. Upon review of this disclosure and appreciation of the concepts disclosed herein, the ordinarily skilled artisan will recognize other sustainable energy contexts in which the present inventive concept can be applied. The scope of the present disclosure is intended to encompass all such alternative implementations.

FIG. 1 is a schematic block diagram of an exemplary sustainable energy system 100 by which the present invention can be embodied. As used herein, "sustainable energy" refers to usage of energy resources that meet present needs without compromising the ability of future generations to meet their own needs, including environmental impact considerations such as the emission of greenhouse gas (GHG).

Generally, sustainable energy system 100 may be considered as comprising a fluid distribution subsystem (FDS) 105 that distributes a controllable blend of energy carrying fluids to end-user sustainable energy customers, and an information and end-user control subsystem (IECS) 109 by which the end-user customer can customize or otherwise request the blend ratios of energy carrying fluids. As used herein, the term "energy carrying fluid(s)" (ECF(s)) is intended to refer to a fluid, such as a gas used in exemplary embodiments described herein, having potential chemical energy that can be converted to another energy form, such as electrical energy in the embodiments described herein. Moreover, according to the present disclosure, distribution and delivery pipelines may convey the fluid in a liquid state, gaseous state, and/or part-liquid part-gaseous state. Nevertheless, in the chemical/electrical conversion process, the conversion is performed when the energy carrying fluids (also referred to herein as mixed fuel fluid) are in a gaseous state and thus the term "gas" is used generally to refer to fuel fluids (e.g., carbon based fuels, such as methane ($CH_4$) and natural gas, and hydrogen ($H_2$)).

FDS 105 may include a source of a first ECF (ECF 1) 2 and a source of a second ECF (ECF 2) 4 coupled to a common pipeline infrastructure 5 through a distribution center 110. Pipeline infrastructure 5 may be part of an ECF delivery system operating as a regulated utility, such as the natural gas delivery system commonly found in urban/suburban/rural localities across the United States and elsewhere. In the exemplary embodiment of FIG. 1, pipeline infrastructure 5 (also referred to as a "delivery pipeline" that receives the mixed fuel fluid from the controllable valve 112 and provides the mixed fuel fluid to the mixed-gas fuel cells 140$x$ and 140$y$) may include separate branches (see in FIG. 1 the upper branch pipeline that connects to mixed-gas fuel cell 140$x$, and the lower branch pipeline that connects to mixed-gas fuel cell 140$y$) that are respectively coupled to individual chemical electricity converters, representatively illustrated at chemical electricity converters 140$x$ and 140$y$, that are constructed or otherwise configured to convert the chemical energy in ECF 2, ECF 4 and/or a blend thereof, into electrical energy that can be delivered via electrical conductors (see, e.g., the lines from the fuel cells 140$x$/140$y$ to the loads (Z) 145$x$/145$y$ in FIG. 1) to respective electrical loads 145$x$ and 145$y$. For purposes of this example, chemical electricity converters 140$x$ and 140$y$, which may be referred to hereinafter as mixed-gas fuel cells, or simple fuel cells 140$x$ and 140$y$, may accept a blend of ECFs such as methane ($CH_4$, e.g., ECF 1) and molecular hydrogen ($H_2$, e.g., ECF 2), but may use only $H_2$ in the redox process that generates electrical current. Methane that is delivered to fuel cells 140$x$ and 140$y$ may first be converted to $H_2$ and introduced to the redox process with $H_2$ delivered as a minority constituent of the blend. As indicated above, embodiments of the present invention may utilize a pipeline infrastructure 5, the original design of which was and continued usage of which is centered on delivery of natural gas (primarily $CH_4$) to utility companies, residences and businesses. Fuel cells 140$x$ and 140$y$ coupled to that pipeline infrastructure 5 have a ready supply of $CH_4$ provided to them and end-users associated with fuel cells 140$x$ and 140$y$ may be afforded some influence over the fraction of $H_2$ that is added to the blend prior to that blend being delivered to fuel cells 140$x$ and 140$y$. Moreover, an end-user, or more particularly an end-user terminal that operates in response to user input, may request a certain amount of $H_2$ in an account-based transaction of an energy demanding entity. As illustrated in FIG. 1, user terminals 150$x$ and 150$y$, or more appropriately, software (an "app") executing on processing resources (not illustrated) of user terminals 150$x$ and 150$y$, chemical electricity converters 140$x$ and 140$y$ and/or a load (e.g., an electrical service a particular residence) connected thereto may be associated with a customer account 132. Such a customer account 132, illustrated in FIG. 1 as stored in memory circuitry 130, may be a database associated with the appropriate energy demanding entity partaking in the benefits of sustainable energy system 100, such as credits and rewards discussed below. A customer account 132 may include, among other things, the identity of the customer (energy demanding entity) and a user profile thereof, customer-operated fuel cell models and their geographic locations and H2-generated electricity usage commitments/contracts. A usage tracking process 124 may monitor and record, among other things, ECF blend orders provided through controls 152x and 152y on respective user terminals 150x and 150y and ECF blend deliveries provided through distribution controller 110. As orders and deliveries are transacted over sustainable energy system 100, usage tracking process 124 records transaction data in the appropriate customer account 132. Moreover, customer account 132 may take reward structure 8 into consideration to credit customer account 132 with a reward, e.g., CO2 offset credits. At regular billing intervals, an operator of sustainable energy system 100 may provide an accounting of orders, deliveries, commitment standings, etc., to the energy demanding entity associated with customer account 132.

In certain embodiments, chemical electrical converters 140x and 140y may implement multiple chemical processes: one chemical process may reform CH4 to H2 with a byproduct GHG, such as CO2, and another chemical process, e.g., a redox process, may convert H2 to electricity with non-GHG byproducts, such as water. Accordingly, for a fixed volume of energy carrying fluid (i.e., a "mixed fuel fluid") containing a CH4 constituent and an H2 constituent, an incremental increase in the H2 constituent corresponds to an incremental decrease in the CH4 constituent. Consequently, less CO2 is generated as a byproduct of reforming the CH4 and the chemical electricity converters 140x and 140y may operate in a more environmentally sustainable manner for substantially the same electricity generated. However, pipeline infrastructure 5 and the fuel cells 140x and 140y may have respective limitations regarding the quantity of H2 that can be tolerated by each component. Embodiments of the present disclosure may provide mechanisms by which a fuel blend that has been requested by an energy demanding entity (e.g., a load associated with an end-user terminal) remains within specifications of the components of the system, such as the fuel cells 140x and 140y, as well as legacy components such as pipeline infrastructure 5.

As illustrated in FIG. 1, sustainable energy system 100 may include a distribution controller 110 that may be accessed by user terminals 150x and 150y over a communications network 10. Distribution controller 110 may be constructed to provide external control over the constituent quantities of the ECF blend, as is described more fully below. To that end, distribution controller 110 may include a valve system 112, which is a controllable valve that controllably opens/closes supply lines of ECF1 and ECF 2 based on a valve control command issued by the control circuitry that is part of the distribution controller 110. The valve system 112 is in fluid communication with pipeline infrastructure 5, the source 3 of ECF 1 and the source 4 of ECF 2. Processing circuitry (or "control circuitry") not separately illustrated in FIG. 1, but which may be implemented with the circuitry of FIG. 14 and the associated programmable circuitry described with respect to FIG. 14)) within distribution controller 110 may apply electrical signals (e.g., valve control command) to valve actuators within valve system 112 to produce a blend of ECF 1 and ECF 2 in accordance with an aggregation of requests made by end-user terminals that service energy demanding entities operating customer loads 145x and 145y. Multiple existing techniques for blending ECFs and for distributing the blend to different localities can be used in practicing the embodiments without departing from the spirit and intended scope thereof. Accordingly, implementation details will be provided herein only where differences exist between features of embodiments of the present disclosure and features in current fluid delivery and control practices. In certain implementations, valve system 112 may include ECF flow valves that are installed as parts of the legacy natural gas distribution system as well as ECF flow valves that are constructed to introduce a minority amount of energy carrying fluid and thereby form an ECF blend in pipeline infrastructure 5. It is to be understood that valve system 112 may operate to afford some level of user control (recognizing that a request from no single user exclusively controls the valve system 112, but provides a constitutional part of an aggregation of requests from multiple end-user terminals that is reflected in the valve control command) over the amount of a minority constituent of an ECF blend, e.g., H2, in practicing the present embodiments, but may operate under certain constraints, such as pressure control in pipeline infrastructure 5, that are within the technical grasp of artisans skilled in fluid distribution may also be implemented in the present embodiments.

IECS 109 may be installed on and may cooperate with FDS 105 to deliver an ECF blend as ordered or otherwise requested by end-user energy demanding entities. To that end, IECS 109 may include individual user terminals, representatively illustrated at user terminals 150x and 150y, communicatively coupled to a server 15 through communications network 10. Server 15 may provide centralized computer processing resources for sustainable energy system 100 and may communicate with other components thereof using suitable signaling/messaging interfaces and protocols that are consistent with those of communication network 10. Sustainable energy services of sustainable energy system 100 provided by server 15 are described in more detail below, but for purposes of the present discussion, it is sufficient to note that such services are centrally available to user terminals 150x and 150y upon a suitable request therefor. In the case where the computing functions of the server 15 are implemented in the distribution controller 110, the user terminals 150x and 150y are communicate via the network 10 to the distribution controller 110). Further, it is to be understood that server 15 is equipped with sufficient processor, memory and input/output circuitry to fulfill those requests as well as to execute other processed described herein. Moreover, it is to be understood that server 15 may be a component of a larger data processing platform including cloud-based and distributed systems. Component and functional descriptions of the server 15 also are supported by FIG. 14 and the corresponding description of FIG. 14). As used herein, "circuitry" may be implemented as a computer that is configured by software to perform the specified functions. Thus, a server, or a controller are two examples of "circuitry" that may be software configurable.

Figure 5A:
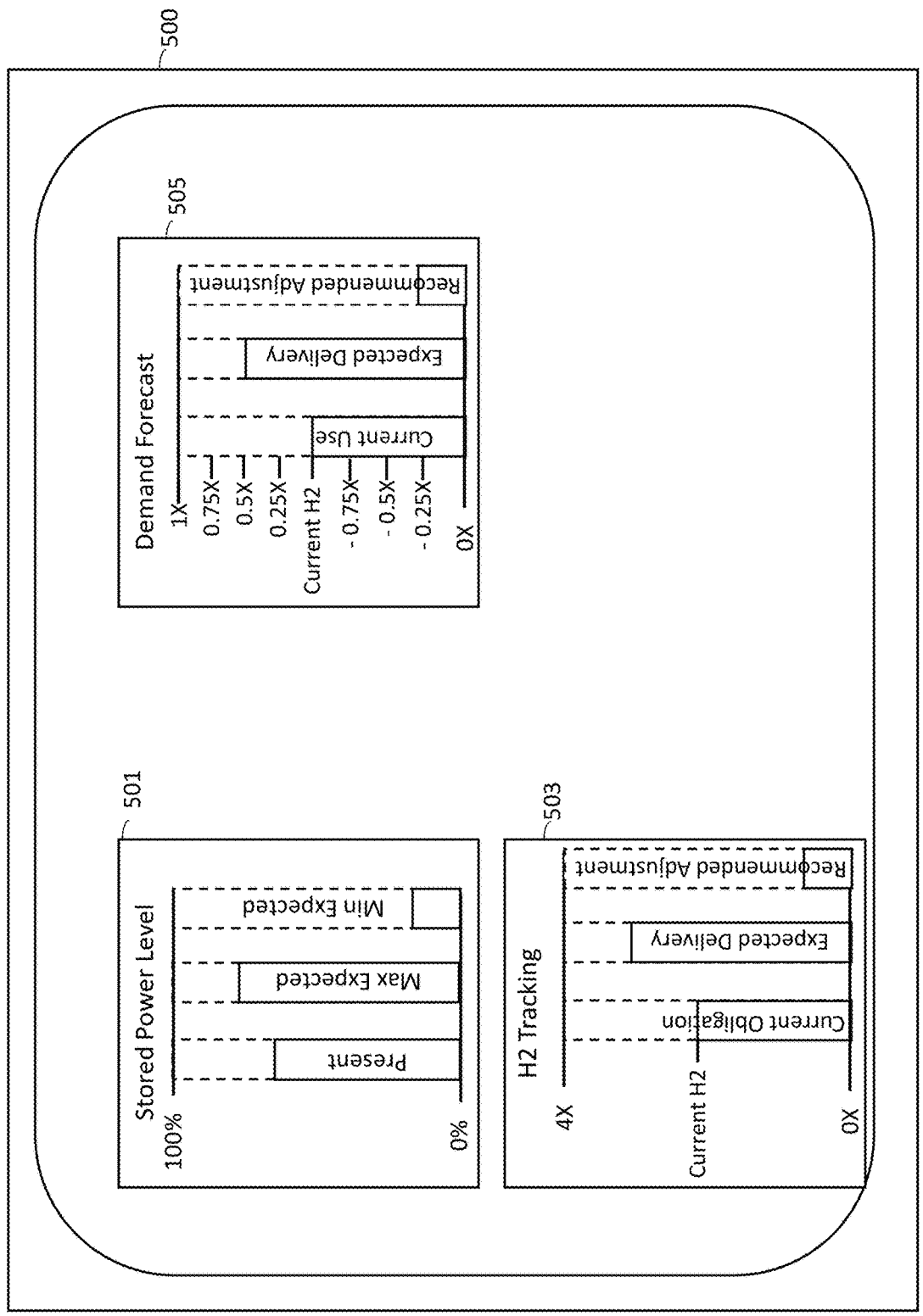
FIG. 5A is an illustration of a first graphical user interface (GUI) of a remote device that selectively requests H2 power generation and tracks H2-based electricity generation for the benefit of a facility that uses electricity generated by the sustainable energy system described in this disclosure.
Figure 5B:
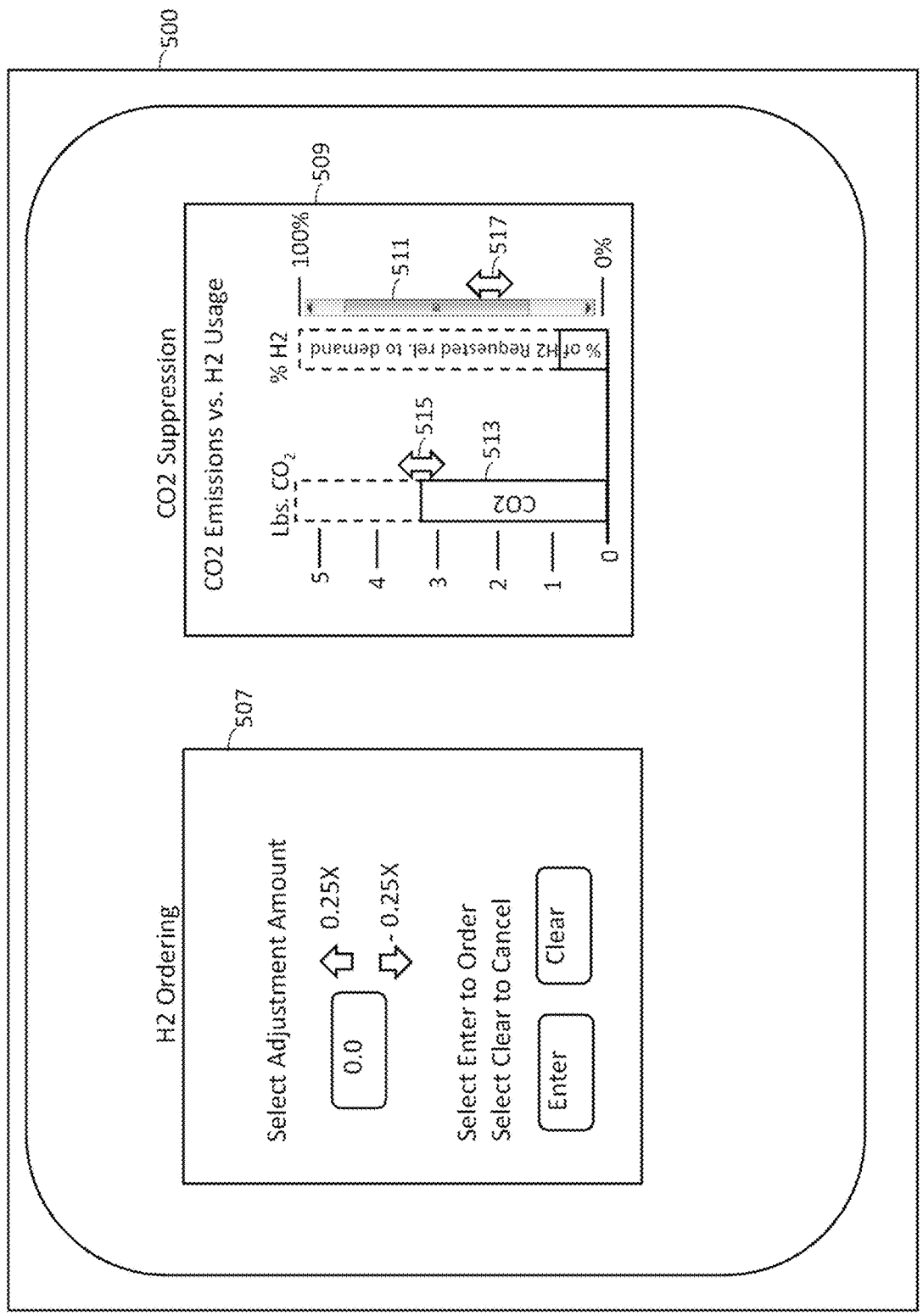
FIG. 5B is an illustration of a second GUI that provides a computer-based H2 ordering tool, and CO2 suppression visualization tool.

Each user terminal 150x and 150y may be equipped with a set of user controls that may be implemented in onboard software, e.g., an app, executing on processing resources of user terminals 150x and 150y. Alternatively, the user terminals 150x and 150y may interact with the server 15 and/or distribution controller 110 by a web page that is served to the user terminals 150x and 150y. FIGS. 5A and 5B are example embodiments of APP or Webpages that are part of a user interface for the user terminals 150x and 150y. Various such controls are exemplified below, but for purposes of the present discussion, it is sufficient to note that at least one control on each user terminal 150x and 150y, representatively illustrated as controls 152x and 152y, may be constructed or otherwise configured to allow the user to define, via the user-interface, and request a blend of ECFs, such as CH4 and H2. In certain embodiments, the blend may be defined by establishing an amount of H2 on controls 152x and 152y, which are referred to hereinafter as blend controls 152x and 152y, and the ultimate ECF blend may be determined on a volume percentage basis, e.g., selecting an amount of H2 on user terminals 150x and 150y is subsequently computed as a percentage against the total volume of ECF in the blend with the remaining percentage corresponding to the volume of CH4 in the blend. It is to be understood, however, that embodiments of the invention may implement reporting of constituents in the ECF blend, such as through suitable sensor technology, that are outside the control of sustainable energy system 100.

As illustrated in FIG. 1, server 15 may comprise processor circuitry 120 and memory circuitry 130 by which sustainable energy services are provided and executed. Among the processes that may be executed by processor circuitry 120 are a distribution control process 122 by which distribution controller may be operated, a usage tracking process 124 by which user activities are monitored and recorded, including ECF blends that have been ordered by end-user energy demanding entities over sustainable energy system 100, and a predictive models process 126 by which future ECF blend demand can be estimated from system activity and behavioral knowledge gleaned from such activity and other historical and state data. In certain embodiments, predictive models process 126 may implement artificial intelligence, such as machine learning, examples of which are described below.

Exemplary memory circuitry 130 (e.g., non-transitory computer readable storage device) may be constructed or otherwise configured to store customer account data 132 that may include user profiles, end-user equipment specifications, billing/credit information and the like, model data 134 corresponding to predictive models process 126 and executable code 136 that may include that of processes 122, 124, 126, an operating and/or file system, processes that may support data tracking and analysis, and so on.

As indicated above, fuel cells 140x and 140y may reform H2 from CH4 and produce a GHG byproduct CO2. Whereas aspects of the present disclosure are directed towards reducing levels of CO2 through prudent specification by an end-user energy demanding entity of an ECF blend, additional aspects may be directed to sequestering or otherwise mitigating the levels of CO2 that remains as a byproduct in the presence of a minority amount of CH4 in the blend. Examples of such CO2 ameliorating techniques are described below, but for purposes of the present discussion, these techniques are collectively represented in FIG. 1 at byproduct GHG sink 6. In so doing, end-user energy demanding entities may benefit from programs that reward GHG amelioration/elimination, such as carbon credits in the US that can be traded amongst entities according to demand/surplus of the GHG being produced by those entities. These programs, and more particularly the benefits thereof that can be exploited by exemplary sustainable energy system 100, may be encoded in executable program code to automatically or with minimal user-machine interaction account for allowed and/or used credits (e.g., carbon credits) and other benefits and are collectively represented in FIG. 1 at rewards structure 8.

Sustainable energy system 100 can correspond to one or more energy systems communicatively coupled to user terminals 150x and 150y and to sustainable energy server 15 via the network 10 (e.g., Internet). Sustainable energy system 100 may be a natural gas distribution system that is integrated with a hydrogen production plant at source 4 of ECF 2, for example. Sustainable energy system 100 can include a hydrogen production plant (or source of H2 provided by a pipeline, or a local source) that includes one or more automatic control valves of valve system 112 that can be configured to control an amount of H2 introduced into the natural gas distribution system in response to various input from the system (e.g., input received from a user using remote device (or mobile processor such as a smartphone, a laptop computer, a tablet computer or another device that provides a display, user interface and transceiver capability, wireless and/or wired digital transceiver communications capability).

Sustainable energy server 15 may represent one or more servers communicatively coupled to user terminals 140x and 140y via communication network 10. Sustainable energy server 15 may also represent a dedicated bank of servers, cloud-based processing, and/or a serverless computing system corresponding to a virtualized set of hardware resources. Once again, the distribution controller 110 may be separate from or a part of the server 15's computer resources.

Valve system 112 may be positioned where an H2 pipeline connects to a natural gas distribution system pipeline. In this context "pipeline" refers to a source of H2 regardless if the source is locally stored/produced and provided to the valve system through a fitting that is compatible with the valve system 112, or if the H2 is piped in from a distant source before being fitted to the valve system 112. Automatic control valves in valve system 112 may be fitted with actuators that can be controlled by temperature or flow sensors, for example. The valves can be controlled by electrical, hydraulic, or pneumatic signals from sensors. The valves can be set to open, closed or anywhere in between, in response to a valve control command, to accurately control flow. The valves are positioned at distribution branches of the pipe network so that the H2 gas added on behalf of a certain facility is not so far upstream of the gas supplied to the fuel cells 140x and 140y that only a small fraction of the added H2 gas is converted to electricity. In one embodiment, one or more control valves of valve system 112 may be positioned on a one-to-one basis for each fuel cell 140x and 140y, or in another embodiment, one or more control valves of valve system 112 may be positioned upstream to provide a source of H2 gas for perhaps a cul-de-sac of facilities, a street of facilities, a neighborhood of facilities, or a municipality of facilities. Some of the facilities may be organized in a cooperative relationship (co-op) that collectively share H2-sourced electricity and credits associated with it. Further, the valves need not be located near the physical location where the H2 is manufactured, but the valves may need to be connected to distribution pipes (or other sources) that deliver the H2 gas to valve system 112.

Chemical electricity converters 140x and 140y may be WATT Fuel Cell Corp.'s IMPERIUM™ 1500 W-NG-48 POX reformed solid oxide fuel cell systems, or fuel cells described in U.S. Pat. Nos. 10,727,513, 7,374,835, and/or 9,627,700, the entire contents of each of which being incorporated herein by reference in their respective entirety.

User terminals 140x and 140y may represent one or more remote devices communicatively coupled to sustainable energy server 15 via communication network 10. User terminals 140x and 140y may be a desktop computer or workstation, laptop, smartphone, cellular phone, tablet, PDA, and the like. User terminal 140x and 140y can be operated by a user to monitor and interact with the sustainable energy system 100. For example, a user can use a user terminal 140x/140y to select their preferred hydrogen usage in their natural gas distribution system as further described herein. In one embodiment, user terminals 140x and 140y interact with the sustainable energy system 100 via a software application (e.g., a mobile application or "app", web application, etc.) as further described herein.

Communication network 10 may be a public network, such as the Internet, or a private network, such as an LAN or WAN network, or any combination thereof and can also include PSTN or ISDN sub-networks. Network 10 may also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known.

Figure 2:
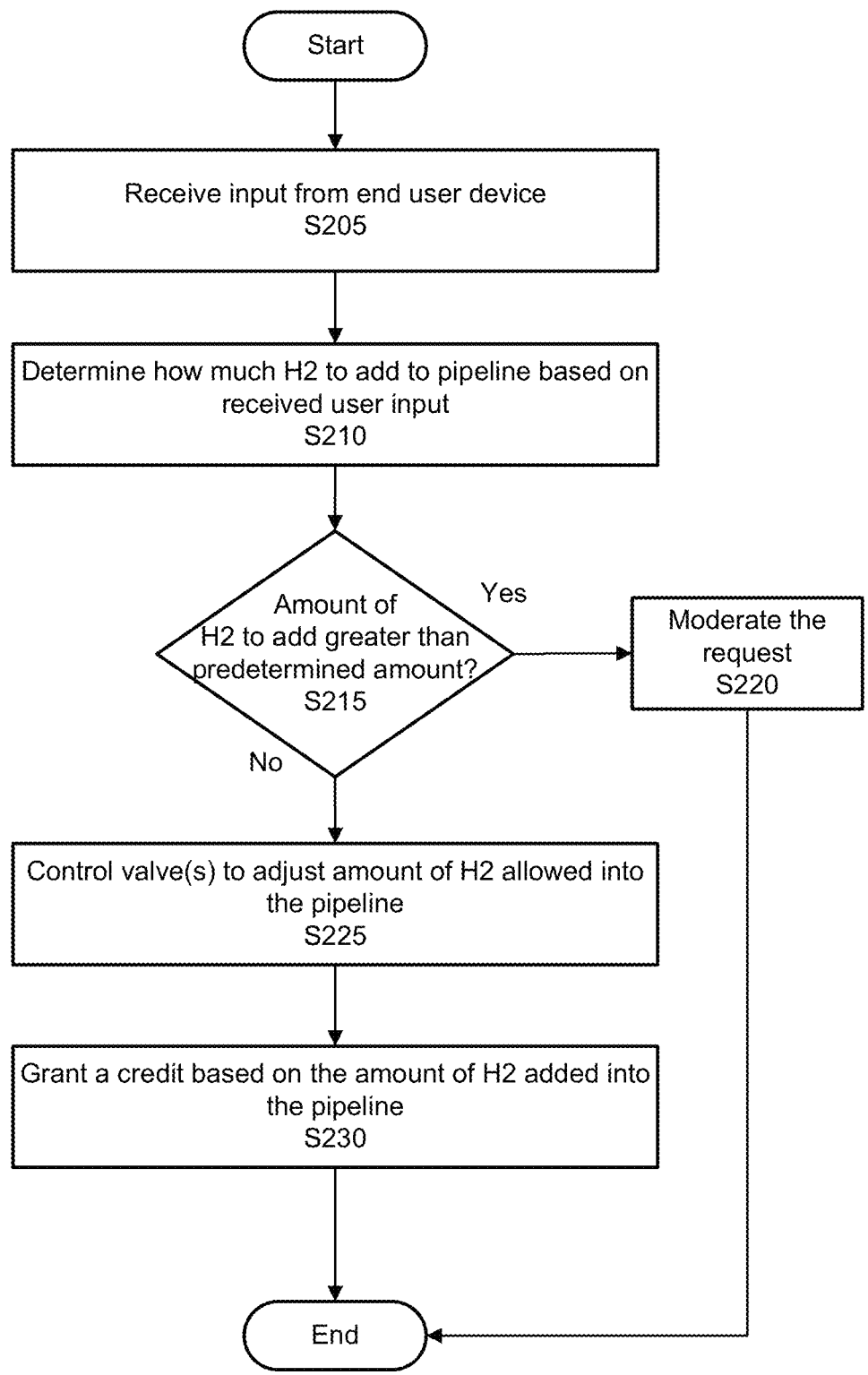
FIG. 2 is flow diagram of an exemplary workflow for operating a sustainable energy system according to one or more aspects of the disclosed subject matter.

FIG. 2 is a flow diagram of an exemplary sustainable energy process 200 by which the present invention can be embodied. Sustainable energy process 200 may be performed on sustainable energy system 100 illustrated in FIG. 1.

In S205, sustainable energy server 15 may receive input signals from an end user device (e.g., user terminal 150x/150y), or via another server or data processing platform that may act as an intermediary. For example, the end user can interact with user terminal 150x/150y to adjust an amount of H2 gas in an ECF blend to be delivered to their natural gas distribution system. In this example, it is to be assumed that the user terminal 150x/150y and sustainable energy server 15 communicate to convey the input signals over communications network 10.

In S210, sustainable energy server 15 may determine an amount of H2 gas to add to the natural gas distribution system based on the received user input (an aggregated amount) in S205. For example, the system controller 115 may recognize, such as by manufacturer provided data, that fuel cell 140x/140y servicing the end-user energy demanding entities associated with user terminal 150x/150y are limited as to a percentage of H2 gas contained in a delivered ECF blend (e.g., fuel cell 140x/140y being limited to a maximum of 40% allocation of H2 gas in the ECF blend, with approximately 60% of the ECF blend being CH4). In this case, requests from user terminal 140x/140y for an amount of H2 gas that is greater than the capacity of any system component in sustainable energy system 100 to handle that amount are rejected or modified (e.g., by capping the amount to the maximum amount permitted by any part in the system, e.g., the mixed-gas fuel cells 140x/140y) by sustainable energy server 15. In certain embodiments, the limitations of mixed-gas fuel cells 140x and 140y define the H2 handling capacity of sustainable energy system 100, but certain implementations may define H2 limitations for reasons other than component function and reliability or system integrity. In such cases, sustainable energy server 15 may modify or reject excessive H2 orders under these other limitations in a manner similar to the modification or rejection of H2 orders exceeding system component tolerances.

In S215, server 15 determines whether the amount of H2 gas to add to the natural gas distribution system is greater than a predetermined amount. For example, the predetermined amount can be a threshold amount of H2 over which fuel cell 140x/140y cannot tolerate (e.g., the 40% threshold discussed above). In response to a determination in S215 that the ordered amount of H2 gas to be added to an ECF blend delivered to fuel cell 140x/140y being greater than the predetermined amount, process 200 may transition to S220, whereby server 15 may moderate the request by adjusting the amount of H2 gas to be added to the natural gas distribution system up to the amount of H2 that fuel cell 140x/140y can support. In certain embodiments, server 15 may transmit a message back to user terminal 140x/140y informing the energy demanding entity that its request is being moderated. Such moderation may occur without user intervention or server 15 may message a request to user terminal 140x/140y to decrease the selected amount of H2, to draw electricity from other sources, and the like. In this example, the drop in H2 is apportioned to requesting users on a proportional amount.

Upon a determination in S215 that the amount of H2 gas to be added to the ECF blend is less than or equal to the predetermined amount, process 200 may transition to S225, by which server 15, and more particularly distribution control process 122, operates one or more valves in valve system 112 of distribution controller 110 to adjust the amount of H2 gas that is added to the pipeline of the natural gas distribution system to the amount requested from the end-user energy demanding entity. If the input received in S205 indicates that a user terminal 140x/140y has increased the amount of H2 gas to add to their natural gas distribution system, distribution controller 110 may actuate valve system 112 to add more H2 gas to the natural gas distribution system. Similarly, if the input received in S205 indicates that the user terminal 140x/140y selects to reduce the amount of H2 gas in the ECF blend of their natural gas distribution system, distribution controller 110 may actuate valve system 112 to decrease the added amount of H2 in the natural gas distribution system.

In S230, server 15 may grant a reward or credit (e.g., carbon credit) based on activity tracking implemented by usage tracking process 124 regarding how much H2 gas an end-user energy demanding entity of the user terminal 140x/140y adds to their natural gas distribution system. The credit or reward can be in the form of one or more of a government tax credit, carbon credit, monetary reward, energy bill rebate, and the like, and may be implemented in hardware and software as indicated above in a reward structure 5.

Figure 3:
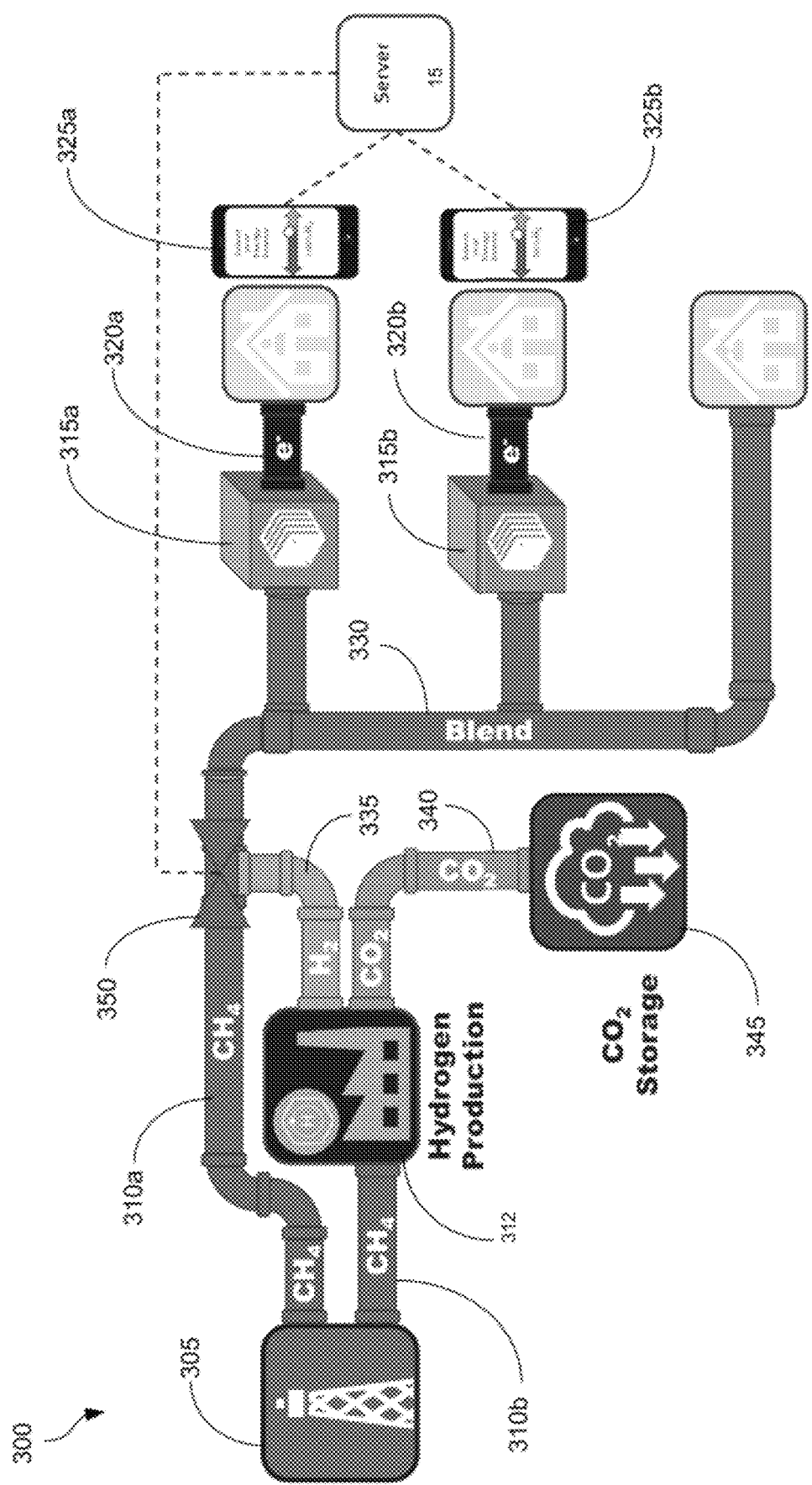
FIG. 3 is an illustration of an exemplary sustainable energy system according to one or more aspects of the disclosed subject matter.

FIG. 3 is an illustration of an exemplary sustainable energy system 300 by which embodiments of the present disclosure can be embodied. Sustainable energy system 300 may be functionally similar to sustainable energy system 100 with both exemplary systems operating under similar sustainable energy paradigms (decrease GHG gas production and reduce emission into atmosphere of remaining GHG production). Sustainable energy system 300 may include a natural gas distribution system 305 serving as pipeline infrastructure 5 of FIG. 1, which may include a first natural gas pipeline 310a and a second natural gas pipeline 310b, but it should be appreciated that there can be many natural gas pipelines in the natural gas distribution system 305 and, as a result, the sustainable energy system 300. The second natural gas pipeline 310b may be connected to the hydrogen production plant 312, which may reform the natural gas (e.g., CH4) into H2 and CO2. An H2 pipeline 335 connects to the first natural gas pipeline 310a and a meter 350 can be configured to determine how much H2 is being added to the natural gas distribution system 305 as further described herein. The natural gas and H2 blend travels through a blended pipeline 330 to one or more fuel cells (e.g., fuel cell 315a, fuel cell 315b) or directly to a structure that uses natural gas (e.g., house, office building, etc.). The fuel cells 315a, 315b may convert the blend of natural gas and H2 into electricity (e.g., 320a and 320b, respectively) that can be provided to a user. As stated above, fuel cells 315a and 315b may first reform the natural gas into H2 and then perform a redox process on the H2 that was ordered and reformed at the fuel cell.

The amount of H2 in the blended pipeline 330 can be adjusted based on user input from smartphones 325a and/or 325b serving as user terminals 150x and 150y of FIG. 1. In one example, smartphones 325a, 325b can be communicatively coupled to a server (e.g., the sustainable energy server 15) via a network (e.g., the network 10), and the sustainable energy server 15 can communicate with the automatic control valves of valve system 112 to control the amount of H2 added to the natural gas distribution system 305. In one aspect, the sustainable energy server 15 can receive a measurement of how much H2 is being added to the first natural gas pipeline 310a from the meter 350 and send instructions to control the automatic control valves 112 through the distribution controller 110 accordingly as described in FIG. 1.

As illustrated in FIG. 3, the CO2 from the reforming process at hydrogen production plant 312 may be transferred to a CO2 storage system 345 through a CO2 pipeline 340.

In one aspect, each fuel cell customer (e.g., end-user energy demanding entity that is associated with a fuel cell 315a or 315b) can select their preferred hydrogen use on a phone application or web application, for example. The user can select from 0% to 100% hydrogen. In one aspect, the software application can also estimate a customer's total monthly hydrogen use, additional cost, and GHG/CO2 reduction using information specific to power supply in that customer's area and display that information to the customer before they make their selection.

Additionally, the customer's hydrogen use selection can be fed to a central server (e.g., the sustainable energy server 15) which aggregates selections from all customers on that natural gas distribution system. In one aspect, the amount of H2 added to the natural gas distribution system fluctuates in real time. Alternatively, the amount of H2 added to the natural gas distribution system can go into effect at predetermined times. For example, customers can have the ability to change their H2 selection once per month and/or make all changes effective at the beginning of the following month.

Sustainable energy server 15 may be constructed or otherwise configured to calculate a total volume of hydrogen needed to meet the demand of one or more customers and to compare that demand amount to the actual volume of hydrogen being delivered into the system. If more hydrogen is needed, sustainable energy server 15 can send instructions (e.g., to the distribution controller 110) to open one or more control valve (e.g., valve system 112) accordingly. Similarly, if excess H2 is being delivered, sustainable energy server 15 may send instructions to distribution controller 110 to close the automatic control valves 112 a corresponding amount.

The meter 350 at a hydrogen injection point (e.g., where the H2 pipeline 335 connects to the first natural gas pipeline 310a) can communicate to the sustainable energy server 15 the amount of hydrogen that is being delivered. Sustainable energy server 15 may send suitable instructions to distribution controller 110 to control the valves of valve system 112 to open or close accordingly.

The amount of hydrogen injected into the natural gas distribution system is typically small relative to the total throughput (e.g., if there are 500 fuel cell customers representing ~230 thousand standard cubic feet per day (Mcfd) of hydrogen demand on a local distribution company (LDC) system with 300,000 Mcfd of natural gas throughput, total hydrogen injected into the system would be less than 0.1% of total system throughput). Although homeowners that do not have fuel cells will still have trace amounts of hydrogen in their natural gas supply, they may be billed as if they were being supplied 100% natural gas. Additionally, each fuel cell customer may only receive trace amounts of hydrogen for their fuel cell, but they will be billed as if they were receiving the amount of hydrogen that they ordered through sustainable energy system 300.

Figure 4:
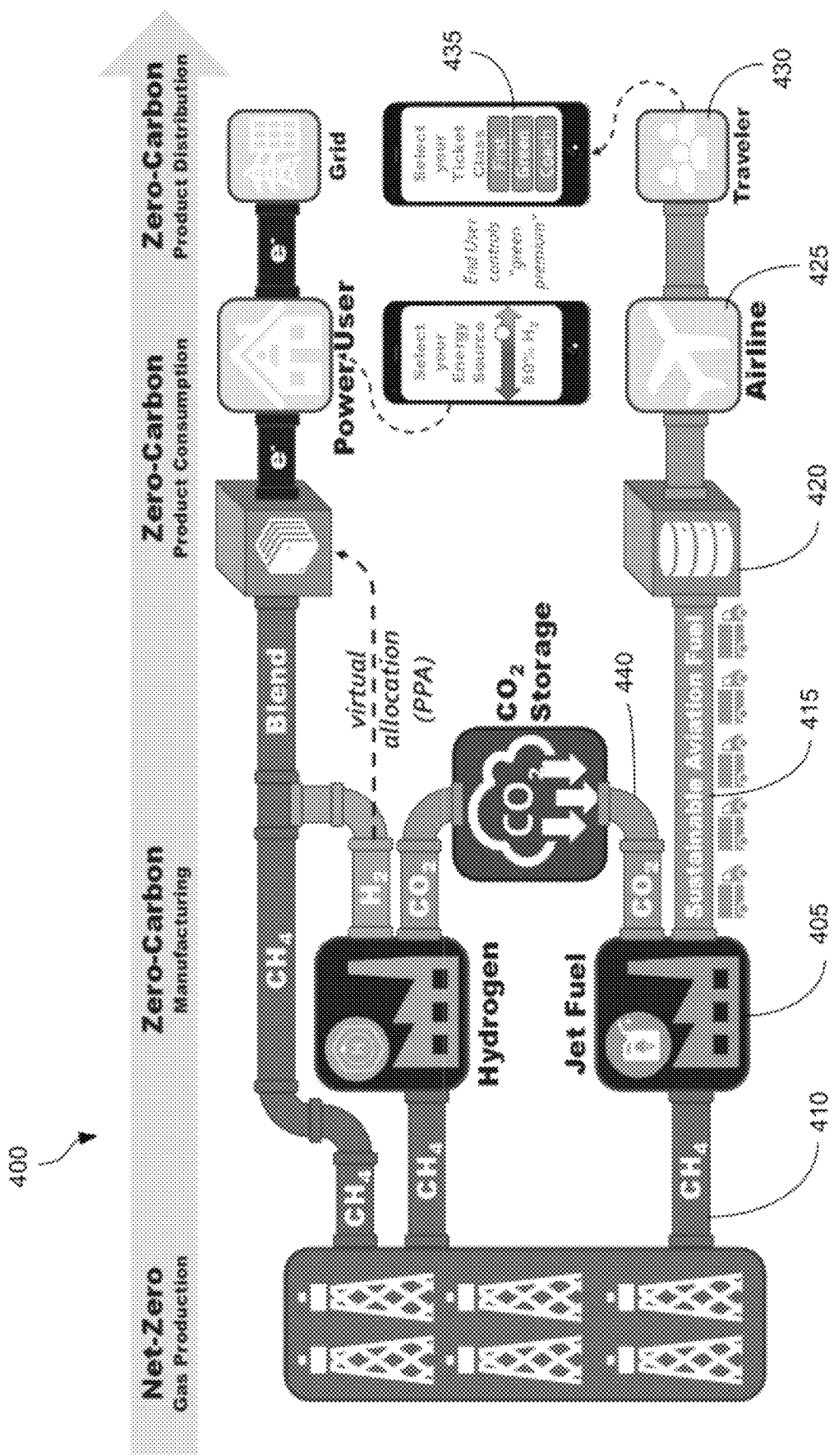
FIG. 4 is an illustration of an exemplary sustainable energy system according to one or more aspects of the disclosed subject matter.

FIG. 4 illustrates an exemplary sustainable energy system 400 that includes a jet fuel production plant 405 according to one or more aspects of the present invention. Because many components of the sustainable energy system 400 of FIG. 4 are the same as the sustainable energy system 300 of FIG. 3, description of overlapping features are omitted for brevity.

The jet fuel production plant 405 can receive natural gas from a third natural gas pipeline 410. The jet fuel production plant 405 can separate CO2 from the process of making aviation fuel and transfer the CO2 to a CO2 storage system (e.g., the CO2 storage system 345) through a CO2 pipeline 440. The sustainably produced aviation fuel can be transferred from the jet fuel production plant 410 to a storage facility 420 via an aviation fuel pipeline 415. Then, an airline 425 can use the sustainably made aviation fuel for their aircraft, for example. As a result of the airline 425 using sustainably made aviation fuel, the airline 425 can offer a traveler 430 an option to purchase a plane ticket that takes the sustainable aviation fuel into account at the time of purchasing the ticket, similarly to how a user can elect to add more H2 into their natural gas distribution system.

Figure 12:
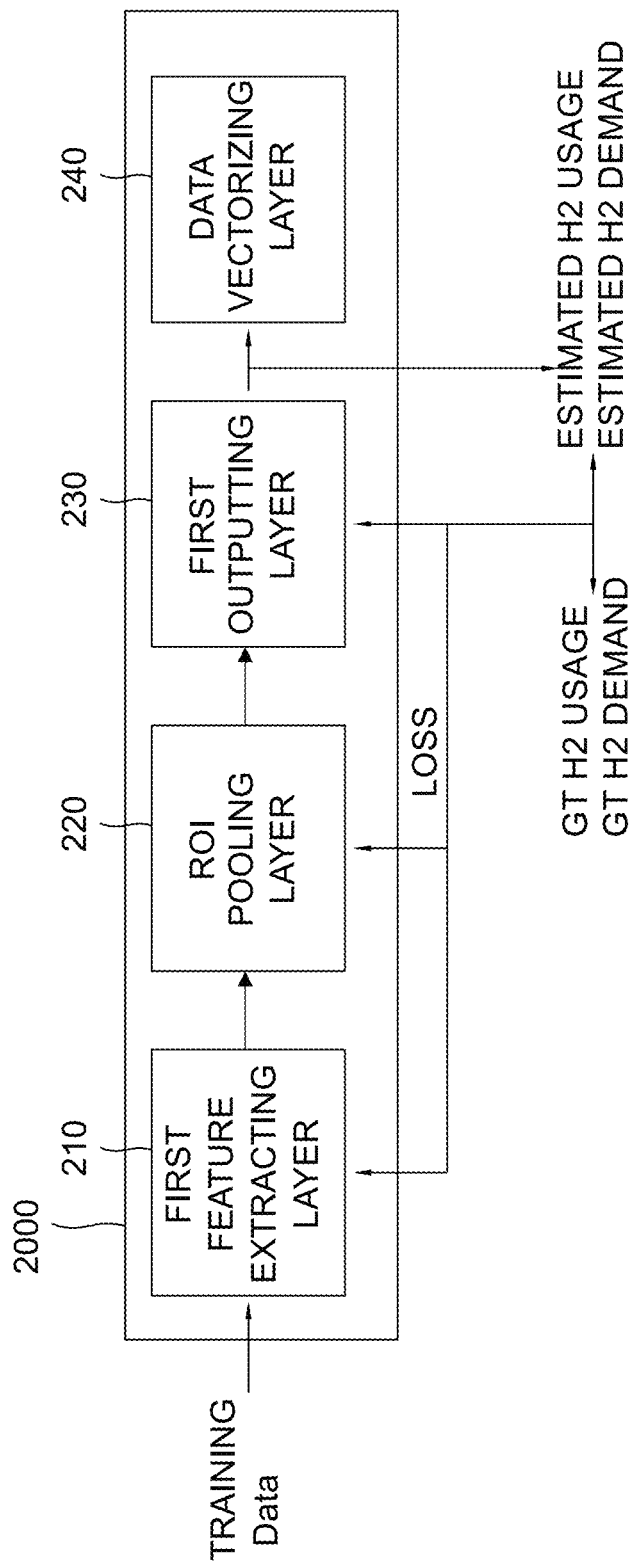
FIG. 12 is a diagram of a data extraction network of the predictive model that extracts data for adjusting H2 levels based on predicted demand.
Figure 13:
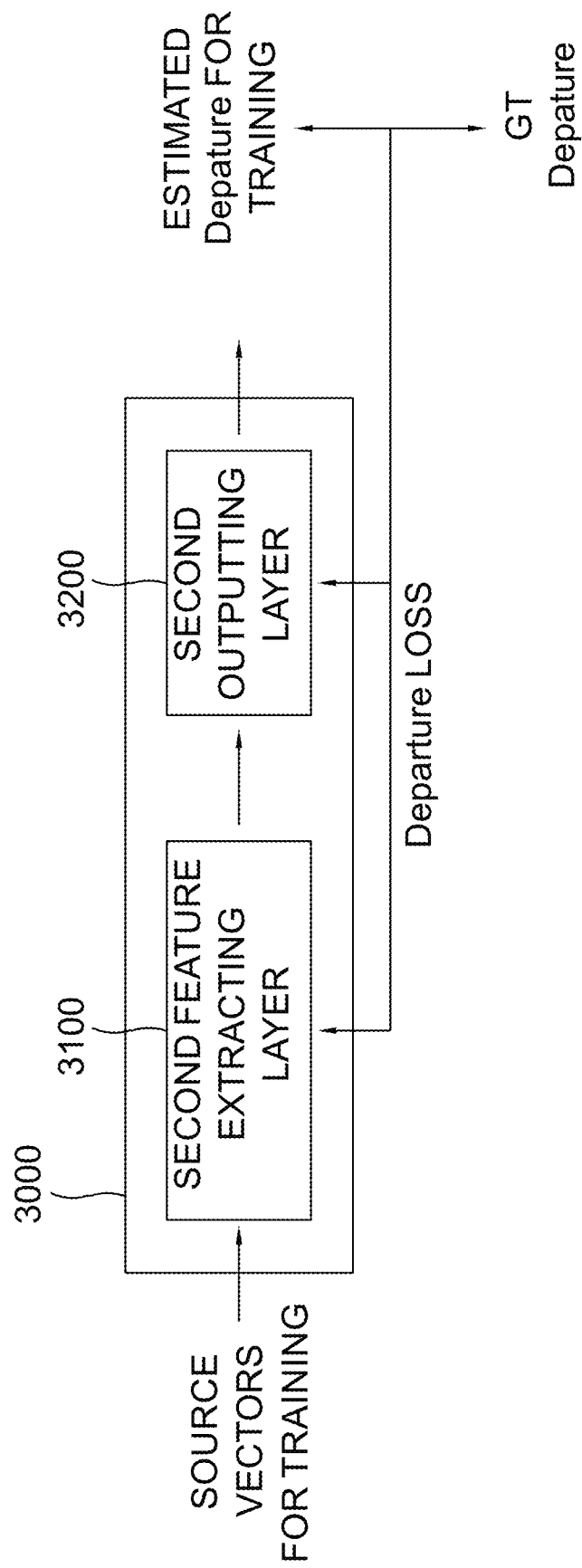
FIG. 13 is a diagram of a data analysis network of the predictive model that analyzes data for adjusting H2 levels based on predicted demand.

FIG. 5A is an illustration of a display 500 hosting a graphical user interface (GUI) presented on user terminal 140x/140y. The GUI includes a first area 501 that displays stored electrical power levels of storage resources for the facility managed by the user terminal 140x/140y. The electricity can be stored in a variety of batteries such as a PWRCELL offered by GENERAC, or a POWERWALL offered by TESLA. It is possible that the facility managed by the user terminal 140x/140y has no appreciable energy storage capability, and in this case power would be provided as on demand electricity pulled off the grid and/or produced on its behalf from the H2-sourced electricity described herein. The displayed power level shows the present power level of all available batteries (or other electrical storage devices) on a scale of 0% (empty) to 100% (maximum storage capacity). Additionally, the first area 501 includes a displayed indication of expected maximum stored power over a period of time (e.g., hourly, daily, weekly, monthly). Similarly, the first area 501 shows expected minimum stored power of the same period of time. The time period may be user selectable, and the expected maximum and minimum levels may be based on running averages that have accumulated over time, and/or an expected level based on input from the predictive models discussed below in reference to FIGS. 11-13. The first area 501 may provide a graphical dashboard of the available stored power at the facility being managed by the user terminal 140x/140y, in comparison to how that power level is likely to change over a specified period of time.

The second area 505 in FIG. 5A provides a visual indication of current use of H2 sourced electricity provided from the H2 production plant 110 and converted to electricity on behalf of the facility managed by the user terminal 140x/140y. The second area also provides indications of expected future delivery of H2 sourced electricity over a specified period of time, as well as any recommended adjustment (adjust up or down). The units of adjustment may be made with reference to the current H2 use level, and an increase of 25% may be indicated as 0.25×, while a decrease of 50% may be indicated as −0.5×.

In certain cases, user terminal 140x/140y may request an adjustment to the H2 gas level provided, on its behalf, to fuel cell 140x/140y because the facility managed by the user terminal 140x/140y may have an obligation to use a certain amount of H2-sourced energy over a period of time. Thus, user terminal 140x/140y (or the sustainable energy server 15 on behalf of the user terminal 140x/140y) may track of the amount of H2-sourced electricity attributed to it, so its obligations can be reliably met.

A third area 503 of display 500 may provide a visual indication of the current obligation for the facility managed by the user terminal 140x/140y, where the facility may be a personal residence, a group of houses, a commercial facility, or a mixed residential/commercial facility. One example commercial facility may be a recharging area for a fleet of electric vehicles. An expected delivery level of about 2.5× is shown, which indicates that an increasing amount of H2 is scheduled to be delivered shortly on behalf of the facility managed by the user terminal 140x/140y. However, it is possible that the amount of H2 gas delivered overshoots or undershoots, and thus the predictive models described below may recommend an adjustment be made on the planned allocation of H2 gas on behalf of the facility managed by the user terminal 140x/140y. The exemplary units shown on third area 503 may be from 0× to 4×, where 0× indicates a request to shut off the H2 gas flow, and 4× indicates 4 times the present level. A different scale may be used that is not limited to 0× to 4×, but may range up to the maximum H2 capacity of the fuel cells 120.

FIG. 5B illustrates a fourth area 507, and a fifth area 509 of a GUI implemented on display 500 that may be presented on a separate screen from first area 501 through third area 505 of FIG. 5A, or the same screen as the first area 501 through the third area 505. Fourth area 507 may be a user interface that allows for a user or automated process using a trained predictive model to make real-time adjustments up or down by units of 0.25×. The selection may be made manually via a touch panel or a selection device (e.g., computer mouse), or the selection by may be made autonomously via the use of a trained artificial intelligence (AI) model for H2 gas adjustment, as exemplified by the device and process described in FIGS. 11-13.

A fifth area 509 of display 500 may provide a dashboard panel that includes a user-actuated slider bar 511. As the user slides the slider bar 511 up and down (as illustrated by the double arrow 517), the graph of "% of H2 Requested rel. to demand" changes with the position of slider 511. Thus, if the slider 511 is moved to the top of the display bar, the display bar has its displayed level (as indicated by an amount of shading that indicates a level, or indicated as a color or other type of indication) to the top of the bar to signify the user wishes to see the effect of selecting H2 gas for all of its remaining on-demand power requirements (i.e., power that the user selects to be produced on its behalf by sustainable energy system 100 (FIG. 1)). Optionally, movement of slider 511 may be tied to the selected adjustment amount available for selection in the fourth area 507. Thus, in response to the user's sliding of the slider 511 to 75%, for example, of the on-demand power requirement, that level may correspond to a 2× adjustment in the fourth display area 507, and that 2× adjustment may be displayed in the display area 507. If the user is satisfied with that level, the user may simply press/select "Enter" and the user terminal 140x/140y will dispatch an H2 "level up" request to sustainable energy server 15, which in turn sends a request to sustainable energy system 100 to increase the amount of H2 gas as a source for electricity generation by the fuel cell 140x/140y by a 2× amount.

The user's movement of the slider 511 may also provide a visual indication of the effect the user's decision has on CO2 emissions. CO2 indicator bar 513 may display an amount of CO2 produced in satisfying the unmet electricity demands for the facility managed by the user terminal 140x/140y. As the user slides the slider 511 up and down, the indicator level of CO2 in indicator bar 513 also dynamically decreases/increases in synchronization with the movement of the slider 511, as indicated by the movement arrow 515. If the slider 517 is increased to 100%, then the indicator on the CO2 indicator bar 513 would reduce to zero. On the other hand, as the user moves the slider 511 down (i.e., requesting less H2 than is needed to satisfy the on-demand power requirements of the facility managed by the user terminal 140x/140y) the indicator on the CO2 indicator bar 513 will increase by a certain amount to indicate the amount in pounds of CO2 that will be produced to generate whatever unmet electricity demand exists with the reduced amount of H2-sourced electricity. In this way, the user is provided with a visual indicator of the amount of CO2 that will be produced based on the user's decision to select less than a full amount of H2-sourced electricity to meet their needs. It is believed this visual feedback may encourage a user to be mindful of choosing a greater percentage of H2-sourced electricity over fossil fuel-sourced electricity to minimize the user's carbon-footprint.

With respect to rate at which the $CO_2$ indicator on the indicator bar 513 may increase in response to a lowering of the slider 511, different geographic regions will have different CO2 regulations and restrictions. For example, local electrical grids in coal-rich regions may be largely fed by coal-fired production facilities, and therefore will have higher levels of CO2 emissions allowed than areas that are serviced by hydro plants, nuclear plants, wind turbines and the like. Similarly, natural gas-sourced electricity production may have a different CO2 limit than geographic locations with electricity produced from other sources. There are numerous other factors (e.g., equipment differences such as carbon capture technologies, etc.) that effect the CO2 emissions rates and the regulations thereon for a certain region. In certain embodiments, such localized information may be made available from sustainable energy server 15. Therefore, the processor that renders the CO2 indicator bar 513 in fifth area 509 may have access to that information, such as in a look up table that includes entries of pounds of CO2 per kWh of generated electricity. Thus, if one kWh of H2-sourced electricity is substituted for one kWh of electricity sourced by other means in that locality, the CO2 level in the indicator bar 513 will move according to the CO2 amount produced at that locality for 1 kWh of electricity.

FIG. 6 is an illustration of exemplary entries of a database, such as may be implemented in memory circuitry 130, for a facility serviced by the user terminal 140x/140y. The facility may have a contractual, tax, or certification obligation to avoid relying on energy sources that produce more than a predetermined amount of GHG on behalf of that facility. Alternatively, the facility may have a self-regulated target of using a certain percentage of "clean" energy for its operations. In either circumstance, the user terminal 140x/140y (or the sustainable energy server 15 on its behalf) may track of the amount of H2 used for its power requirements, and likewise able to determine levels of CO2 that was produced in making the electricity used to satisfy the facility's power demands. Over a given week (although other time periods such as daily, monthly, quarterly and the like may also be used), the facility may be obligated to use a certain amount of electricity that is generated from H2, and thus required to avoid using electricity generated from CO2-producing sources. Satisfying the obligation may be important to the facility to maintain certain tax credits or the like. However, the facility's actual use may be lower than the obligated use. In the example of the first data row in FIG. 6, the facility was obligated to use 100 kWh of H2-sourced electricity, but only used 60 kWh, with a difference of 40 kWh. In the second week, the week of November 8, say, the facility used 15 kWh more than its obligation, for a running difference of negative 25 kWh for the month of November. Assuming that the facility will plan to meet its obligations, the system may distribute the remaining shortfall (25 kWh in this case) in up to 25% incremental increases of its current usage over the next week. This is reflected in the "scheduled" amount of H2-sourced electricity production for the week of November 15 in FIG. 6. If additional amounts are needed above what can be attributed to the facility during the week of November 15, then the additional amount may be allocated to the following week. Histories of past usages, and actual vs. scheduled adjustments may be used to train an AI predictive model, as will be discussed in reference to FIGS. 11-13.

FIG. 7 is an illustration of exemplary entries in a stored database of expected electricity demand on an hourly basis; although longer or shorter time periods may be used such as minute to minute, hour to hour, week to week, or month to month may be used as well. Various facilities will have differing power demands, some of which may be cyclical (e.g., diurnal heating/cooling for various seasons), and other are less predictable, such as electrical vehicle power consumption. Additionally, as opposed to having one fuel cell 140*x*/140*y* per facility, it is possible for a single fuel cell 140*x*/140*y* to service a group of facilities (e.g., several houses on a cul-de-sac) in a cooperative (co-op) arrangement. In these cases, the level of demand increases, as well as the distribution of times at which changes in demand occur on a 24 hour cycle.

FIG. 8 is an illustration of database entries tracking on-site energy storage usage (as previously discussed). In this case, stored electricity is stored from a single example supply source. The facility may also have renewable power sources such as solar panels or wind-turbine(s) that provide electricity during certain periods, but not in other periods. On-demand electricity provided from the grid (along with its associated CO2 emissions), as well as H2-sourced electricity may be used to in the lull periods in which the other sources do not provide electricity. Running totals of the amount of electricity provided on an hourly basis (in this example) may be recorded, as well as reserve amounts of electricity stored in batteries. This information may also be made available to train predictive models described further in FIGS. 11-13.

Figure 9:
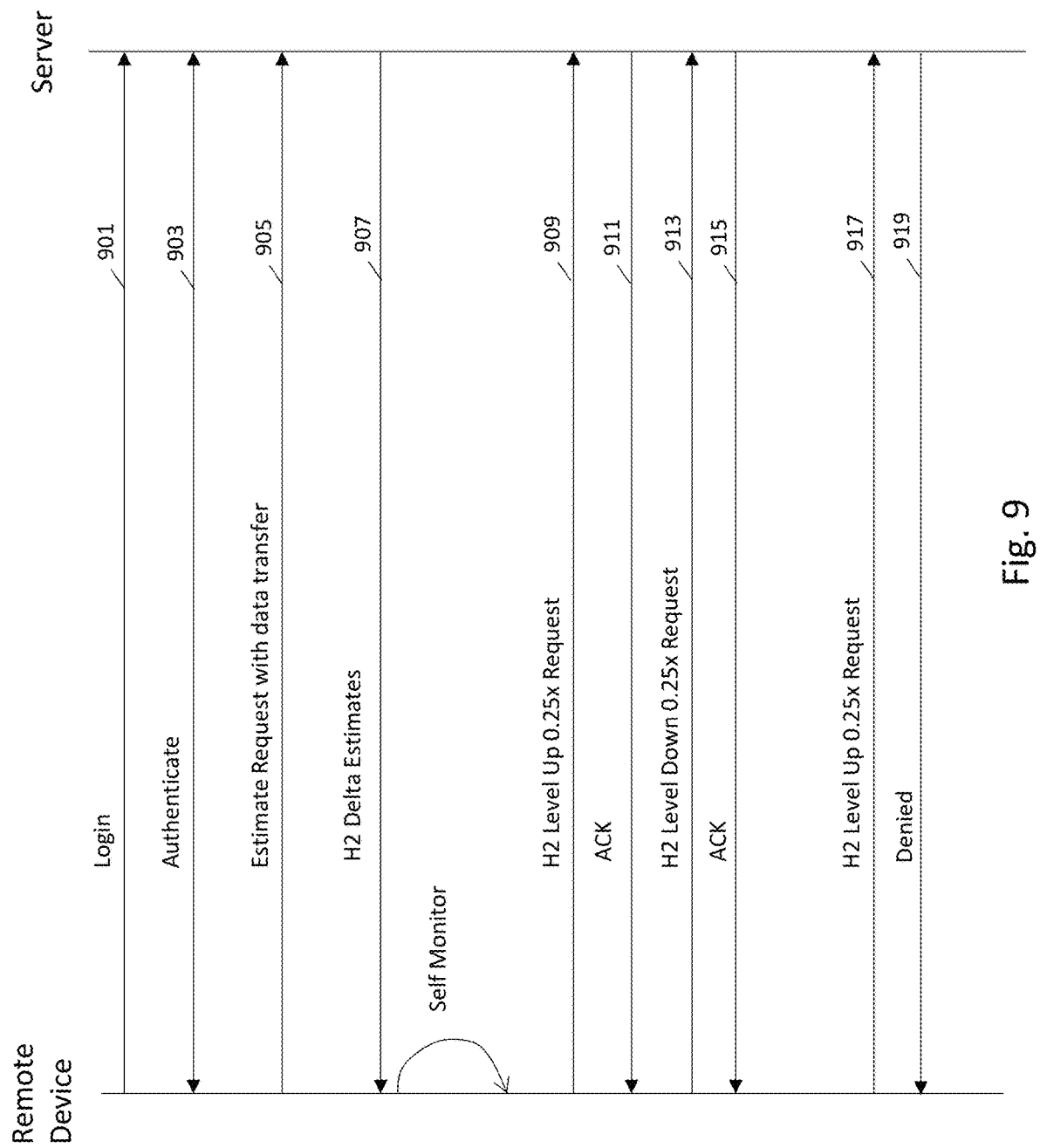
FIG. 9 is a sequence diagram showing communication signals between a remote device and a server as part of a gas flow and regulation process that controls an amount of H2 gas added to a gas supply pipeline that is attributable to a facility associated with the remote device.

FIG. 9 is a sequence diagram illustrating exemplary communication exchanges between a remote device such as user terminal 140*x*/140*y*, and a server such as sustainable energy server 15 by which the present disclosure may be embodied. The remote device may attempt to log into the server in signal(s) 901. The server may challenge the remote device with signal(s) 903 in order to authenticate the remote device. Signal(s) 905 from the remote device may provide the server with usage and demand data, such as that previously described, and with requests for an estimate of the amount of H2-sourced electricity the facility managed by the remote device could use. (As an alternative, the remote device may also perform the estimate itself without a request to the server). Subsequently, the server may send a signal(s) 907 to the remote device with any H2 difference information (i.e., increase or decrease relative to current usage). The remote device may then continue to monitor energy usage and demand by onboard means.

If the remote device receives an automated request from a predictive model, or a manually entered request from a user of the device to change the H2 level, the remote device may send a signal(s) 909 to the server, which may acknowledge (ACK 911) the request. In the illustrated example, a request for 0.25 times the current usage is requested as an incremental increase in H2-sourced electricity, but this is merely an example for convenience. If more H2-source electricity is required, the signaling repeats as indicated by signals 913 and 915. However, it is also possible that the fuel cell 140*x*/140*y* associated with the remote device may have reached its H2 capacity (e.g., up to 40% H2 in the ECF blend) and thus cannot accommodate the request in signal(s) 917. Under this condition, the server may send a deny signal(s) 919 and the facility served by the device may need to deploy alternative power means.

Figure 10:
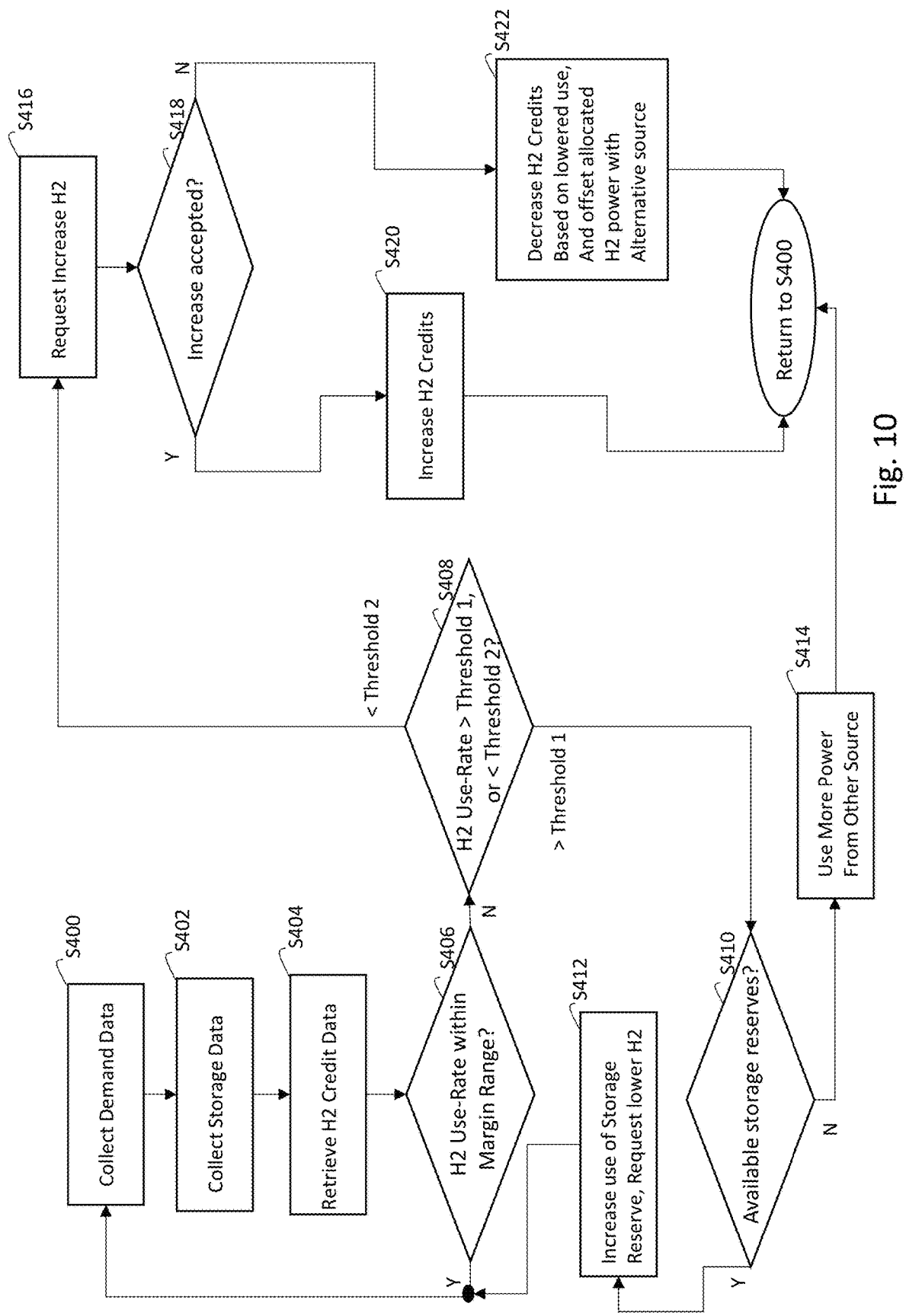
FIG. 10 is flowchart of a process for adjusting an amount of H2 gas attributable to an account managed by the remote device.

FIG. 10 is a flowchart of an exemplary process that may be employed at a user terminal 140*x*/140*y*, at the sustainable energy server 15 or distributed across both. The process begins in step S400 where demand data (e.g., FIG. 7) is collected. Storage data (e.g., FIG. 8) and H2 credit data (e.g., FIG. 6) may be respectively retrieved in steps S402 and S404. The process makes a query in step S406 regarding whether the H2 use-rate is within a predetermined range (e.g., +/−25% of total current use). If the response to the query is affirmative, the process returns to 5400 and the monitoring repeats. However, if the response to the query in S406 is negative, the process proceeds to another query in S408 in two parts: is the H2 use rate above a Threshold 1, or is the H2 use rate below a Threshold 2? If the response is that the H2 use rate is above Threshold 1, the process proceeds to another query in step S410 regarding whether there are available storage reserves (e.g., storage batteries). If the response to query in step S410 is affirmative, then the process requests in S412 that more storage reserves be used, and the process returns to S400. However, if the response to the query in step S410 is negative, the process may request in S414 more power from another source and the process may then return to step S400.

Returning to the query in S408, if the response is that the H2 use-rate is less than Threshold 2, the process proceeds to step S416 in which the processor in the user terminal 140*x*/140*y* requests that sustainable energy server 15 increase the level of H2. Subsequently, the process proceeds to step S418 in which a query is made regarding whether the request for the increase was accepted. If the response to the query is affirmative, the process proceeds to step S420 where the process increases the amount of H2 credit attributable to the facility serviced by the user terminal 140*x*/140*y*. However, if the response to the query in step S418 is negative, the process proceeds to step S422 wherein the H2 credits are decreased based on lower use of H2, and the process offsets the unmet demand with a request for power from an alternative source (e.g., obtaining electricity directly off the grid).

Figure 11:
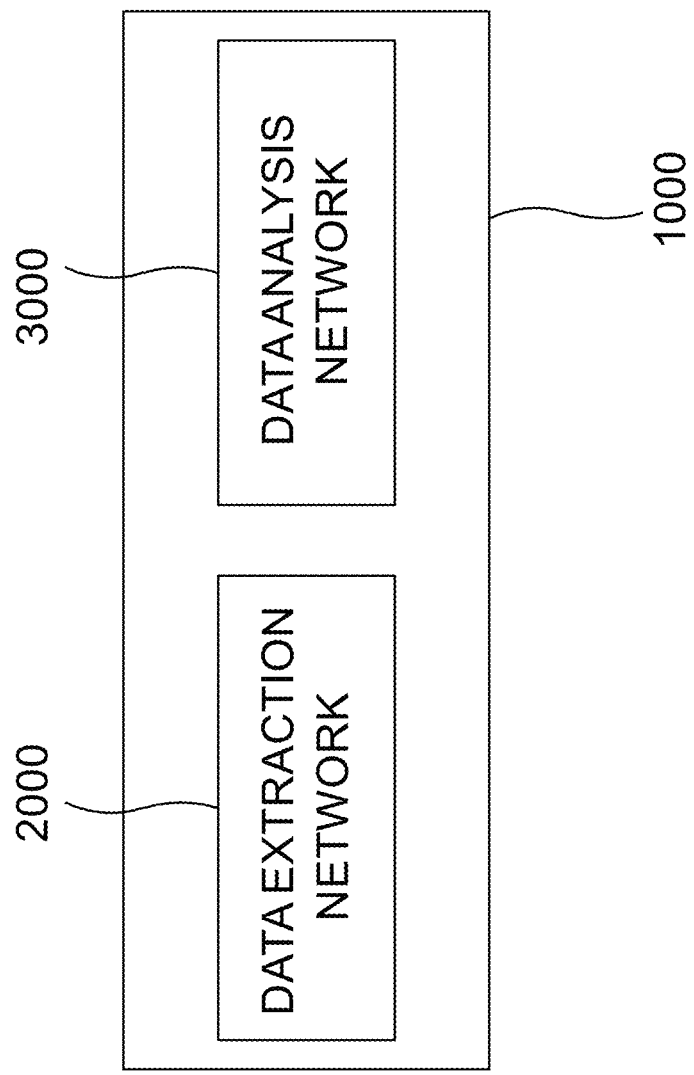
FIG. 11 is a diagram of a computer-implemented predictive model containing a data extraction network and data analysis network that predicts expected power demand and H2 gas adjustments that should be made based on historical behavioral data.

Hereinafter, how a computing device 1000 calculates an expected H2 demand/usage will be explained. The computing device 1000 (which may be implemented in the processing device of FIG. 14) may include a data extraction network 2000 and a data analysis network 3000, as shown in FIG. 11. Further, to be illustrated in FIG. 12, the data extraction network may include at least one first feature extracting layer 210, at least one Region-Of-Interest (ROI) pooling layer 220, at least one first outputting layer 230 and at least one data vectorizing layer 240. And, also to be illustrated in FIG. 13, the data analysis network 300 may include at least one second feature extracting layer 310 and at least one second outputting layer 320.

Below, specific processes of developed a learned model to calculate H2 demand/usage will be explained. To begin with, a first embodiment of the present disclosure will be presented.

First, the computing device 1000 may acquire at least one subject data file, such as those described in reference to FIGS. 6, 7 and 8. After the subject data files are acquired, in order to generate a source vector to be inputted to the data analysis network 3000, the computing device 1000 may instruct the data extraction network 2000 to generate the source vector including (i) an apparent usage, and (ii) an apparent demand.

In order to generate the source vector, the computing device 1000 may instruct at least part of the data extraction network 2000 to detect expected demand and expected usage.

Specifically, the computing device 1000 may instruct the first feature extracting layer 210 to apply at least one first convolutional operation to the subject data files, to thereby generate at least one subject feature map. Thereafter, the computing device 1000 may instruct the ROI pooling layer 220 to generate one or more ROI-Pooled feature maps by pooling regions on the subject feature map, corresponding to ROIs on the subject files which have been acquired from a Region Proposal Network (RPN) interworking with the data extraction network 2000. And, the computing device 1000 may instruct the first outputting layer 230 to generate at least one estimated apparent H2 usage and at least one estimated H2 demand. That is, the first outputting layer 230 may perform a classification and a regression on the subject files, by applying at least one first Fully-Connected (FC) operation to the ROI-Pooled feature maps, to generate each of the estimated H2 usage and the estimated demand as a source vector.

Then, the computing device 1000 may instruct the data analysis network 3000 to calculate an estimated H2 demand by using the source vector. Herein, the second feature extracting layer 310 of the data analysis network 300 may apply second convolutional operation to the source vector to generate at least one source feature map, and the second outputting layer 320 of the data analysis network 300 may perform a regression, by applying at least one FC operation to the source feature map, to thereby calculate the estimated H2 demand and estimated H2 demand.

As shown above, the computing device 1000 may include two neural networks, i.e., the data extraction network 200 and the data analysis network 300. The two neural networks should be trained to perform said processes properly. Below, how to train the two neural networks will be explained.

First, the data extraction network 2000 may have been trained by using (i) a plurality of training files corresponding to previous demand scenarios for training, including their corresponding actual demands for training, and (ii) a plurality of their corresponding round truth demands and usages. More specifically, the data extraction network 2000 may have applied aforementioned operations to the training files, and have generated their corresponding estimated H2 demands and H2 usages. Then, (i) each of pairs of each of the estimated H2 demands and each of their corresponding ground truth (GT) demands and (ii) each pairs of each of the estimated usages and each of the GT usages may have been referred to, in order to generate at least one usage loss and at least one demand loss, by using any of loss generating algorithms, e.g., a smooth-L1 loss algorithm and a cross-entropy loss algorithm. Thereafter, by referring to the usage loss and the demand loss, backpropagation may have been performed to learn at least part of parameters of the data extraction network 200. Parameters of the RPN can be trained also, but a usage of the RPN is a well-known prior art, thus further explanation is omitted.

Herein, the data vectorizing layer 240 may have been implemented by using a rule-based algorithm, not a neural network algorithm. In this case, the data vectorizing layer 240 may not need to be trained, and may just be able to perform properly by using its settings inputted by a manager.

As an example, the first feature extracting layer 210, the ROI pooling layer 220 and the first outputting layer 230 may be acquired by applying a transfer learning, which is a well-known prior art, to an existing object detection network such as VGG or ResNet, etc.

Second, the data analysis network 3000 may have been trained by using (i) a plurality of source vectors for training, including apparent usages for training and apparent demands for training as their components, and (ii) a plurality of their corresponding GT usages and demands. More specifically, the data analysis network 3000 may have applied aforementioned operations to the source vectors for training, to thereby calculate their corresponding estimated usages for training. Then each of height pairs of each of the estimated usages and each of their corresponding GT usages may have been referred to, in order to generate at least one usage loss, by using said any of loss algorithms. Thereafter, by referring to the usage loss, backpropagation can be performed to learn at least part of parameters of the data analysis network 300.

After performing such training processes, the computing device 100 can properly calculate the estimated H2 usages and estimated H2 demands by using the subject files including the subject files that were used to track manually selected usages and demands.

In the above descriptions any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 14:
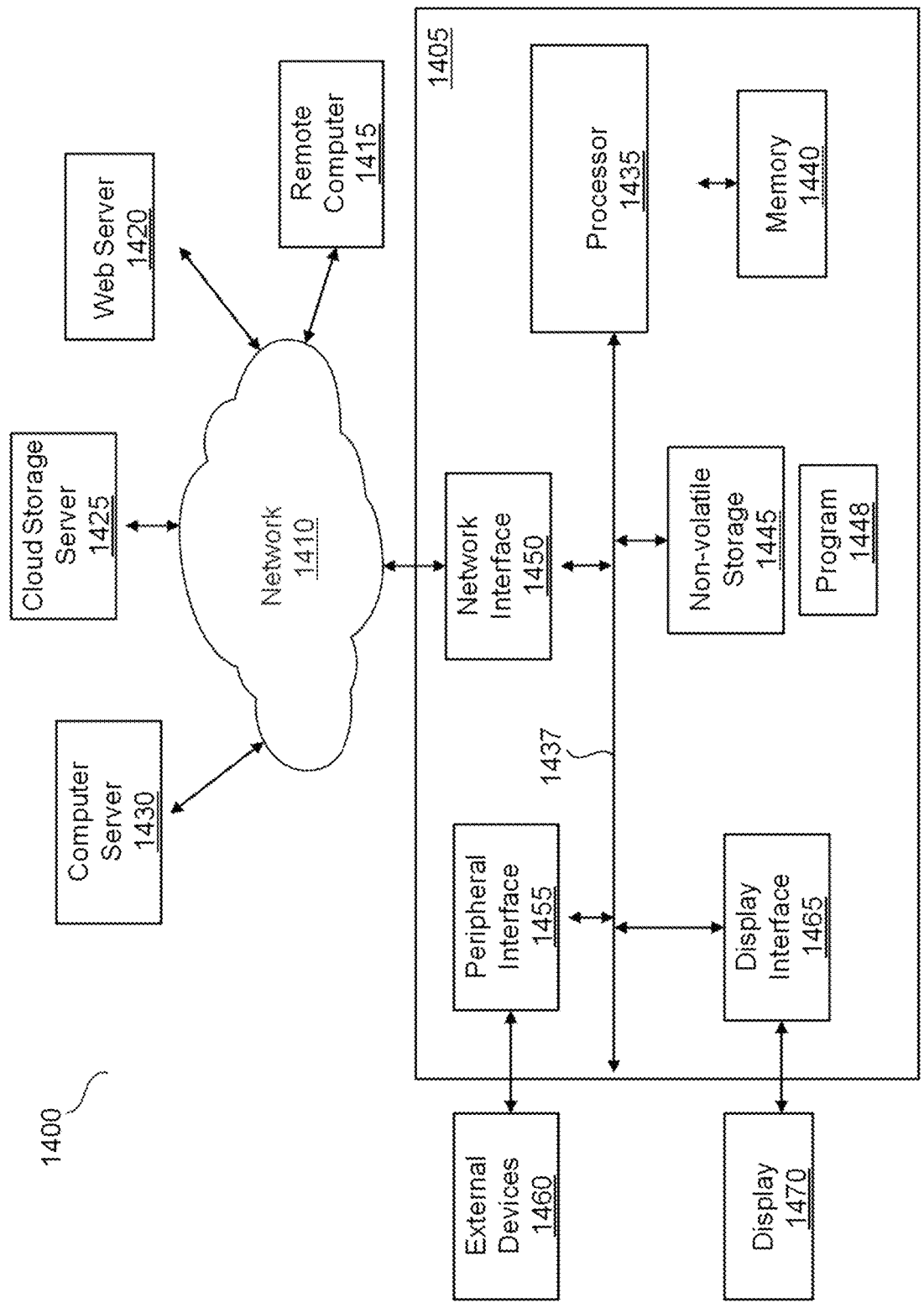
FIG. 14 is an illustration of a hardware block diagram of a server according to one or more exemplary aspects of the disclosed subject matter.

FIG. 14 is a functional block diagram illustrating a networked system 800 of one or more networked computers and sustainable energy server 15s. In an embodiment, the hardware and software environment illustrated in FIG. 14 may provide an exemplary platform for implementation of the software and/or methods according to the present disclosure.

Referring to FIG. 14, a networked system 800 may include, but is not limited to, computer 805, network 810, remote computer 815, web sustainable energy server 15 820, cloud storage server 825 and computer server 830. Additionally, it should be appreciated that computer 805 can represent one or more of the system controller 115, the user terminal 140x/140y, and the sustainable energy server 15 130.

Additional detail of computer 805 is shown in FIG. 14. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

According to a first embodiment, a [1] sustainable energy delivery system is described that includes
  a mixed-gas fuel cell configured to convert a mixed fuel fluid into electricity, the mixed fuel fluid including a majority of a carbon-based fuel and a minority of hydrogen (H2);
  a system controller including control circuitry configured to produce a valve control command based on inputs aggregated from a plurality of user terminals;
  a controllable valve configured to adjust an amount of H2 from a first pipeline that is added to the carbon-based fuel provided from a second pipeline in response to the valve control command;
  a delivery pipeline that receives the mixed fuel fluid from the controllable valve and provides the mixed fuel fluid to the mixed-gas fuel cell;
  an electrical conductor that conveys electricity produced by the mixed-gas fuel cell to a load, wherein
  the system controller is configured to alter the valve control command based, at least in part, on a requested amount of H2 requested by a user terminal associated with the load, the user terminal being one of the plurality of user terminals.

Also described is [2], which is the sustainable energy delivery system of [1], further comprising:

another mixed-gas fuel cell; and
another electrical conductor that conveys electricity produced by the another mixed-gas fuel cell to another load, wherein
the delivery pipeline includes
a first branch that connects to the mixed-gas fuel cell, and
a second branch that connect to the another mixed-gas fuel cell, the first branch being different than the second branch.

Also described is [3], which is the sustainable energy delivery system of [1], wherein:
the system controller comprises a web server that is configured to serve a webpage, via an Internet, on a display of the user terminal that presents on the display a user-selectable H2 amount to be requested on behalf of the load.

Also described is [4], which is the sustainable energy delivery system of [3], wherein:
the system controller is also configured to cause the webpage to present on the display of the user terminal a cost associated with a selected amount of H2.

Also described is [5], which is the sustainable energy delivery system of [3], wherein:
the system controller is also configured to cause the webpage to present on the display of the user terminal an indication of a change in an amount of carbon dioxide (CO2) produced based on a selected amount of the user-selectable amount of H2 to be requested on behalf of the load.

Also described is [6], which is the sustainable energy delivery system of [3], wherein:
the system controller is also configured to cause the webpage to present on the display an indication of an amount of carbon credit associated with a selected amount of the user-selectable amount of H2 to be requested on behalf of the load.

Also described is [7], which is the sustainable energy delivery system of [1], wherein:
under a condition an aggregated amount of H2 requested by the plurality of user terminals exceeds a predetermined amount, the system controller is configured to set the valve control command to limit the amount of H2 to not exceed the predetermined amount.

Also described is [8], which is the sustainable energy delivery system of [7], wherein the predetermined amount of H2 corresponds with a maximum H2 percentage the mixed-gas fuel cell is configured to accommodate.

Also described is [9], which is the sustainable energy delivery system of [1], further comprising:
a non-transitory computer readable medium having instructions stored therein that when executed by a mobile processor cause the mobile processor to run an application (APP) that provides on a display of the mobile processor a user-selectable H2 amount to be requested on behalf of the load, wherein the mobile processor being the user terminal.

Also described is [10], which is the sustainable energy delivery system of [9], further comprising:
the mobile processor, the mobile processor being one of a smartphone, a tablet computer, and a laptop computer, and
the mobile processor includes a wireless transmitter that is configured to wirelessly transmit a request message to the system controller, the request message including an indication of the H2 amount requested on behalf of the load.

Also described is [11], which is the sustainable energy delivery system of [1], further comprising:
the user terminal, the user terminal having an account associated with the load, and including a user interface, a transceiver, and processing circuitry, the processing circuitry configured to
generate a request signal in response to receiving H2 request information via the user interface, and
transmit the request signal to the system controller, the request signal including an indication of the H2 amount requested by a user terminal.

Also described is [12], which is the sustainable energy delivery system of [1], wherein:
the carbon-based fuel has CH4 as a main component.

Also described is [13], which is the sustainable energy delivery system of [2], wherein:
the load is an electrical service for a first residence, and
the another load is another electrical service for a different residence.

Also described is [14], which is the sustainable energy delivery system of [1], wherein
the system controller is configured to
apply a trained AI engine to estimate an amount of H2 for the user terminal to request in order to offset, by a predetermined amount, CO2 emissions associated with an amount of the carbon-based fuel spent by the mixed-gas fuel cell to meet an electricity demand at the load, and
simultaneously present on a display of the user terminal the estimate and a user-selectable H2 request interface that enables a user to request the requested amount of H2 for the load.

Also described is [15], which is the sustainable energy delivery system of [1], wherein
a proportion of electricity produced by the mixed-gas fuel cell for the load that is due to H2 and charged to an account for the first load is different than a proportion of H2 to carbon-based fuel to H2 that is output from the controllable valve.

According to a second embodiment, a [16] controller for a sustainable energy delivery system is described, wherein the controller includes:
circuitry configured to produce a valve control command based on input aggregated from a plurality of user terminals;
a controllable valve that is configured to adjust an amount of hydrogen (H2) provided from a first pipeline to carbon-based fuel provided from a second pipeline in response to receipt of the valve control command, the controllable valve provides to a delivery pipeline mixed fuel fluid that is input to a mixed-gas fuel cell that converts the mixed fuel fluid into electricity that is a provided to a load, wherein
the controllable valve is configured to control the amount of H2 mixed with the carbon-based fuel so a resultant about of H2 in the mixed fuel fluid is less than an amount of carbon-based fuel, and
the circuitry is configured to alter the valve control command based, at least in part, on a requested amount and/or percentage of H2 requested by a user terminal associated with the load, the user terminal being one of the plurality of user terminals.

Also described is [17], which is the controller of [16], wherein:
the circuitry is configured to produce the valve control command to accommodate an amount of H2 requested by the user terminal for the load, and also another amount of H2 requested a different user terminal associated with a different mixed-gas fuel cell that provide an electrical service to a different load.

Also described is [18], which is the controller of [16], wherein:

carbon-based fuel comprises mainly methane (CH4).

According to a third embodiment, a [19] method for controlling a sustainable energy delivery system is described that includes receiving at a system controller from a first user terminal associated with a first load a first message with a first requested amount of hydrogen (H2) on behalf of the first load, the H2 being a minority component of a mixed fuel fluid having carbon-based fuel as a majority component;

receiving at the system controller from a second user terminal associated with a second load a second message with a second requested amount of H2 on behalf of the second load;

aggregating the first requested amount of H2 and the second amount of H2 and forming an indication of an aggregated amount of H2;

generating a control valve control command that corresponds to the aggregated amount of H2;

applying the control valve control command to a controllable valve;

adjusting by the controllable valve to apply the aggregated amount of H2 supplied from a first pipeline to the carbon-based fuel supplied from a second pipeline so as to create the mixed fuel fluid;

generating a first electrical current by a first mixed-gas fuel cell that receives a first portion of the mixed fuel fluid and providing the first electrical current to the first load; and generating a second electrical current by a second mixed-gas fuel cell that receives a second portion of the mixed fuel fluid and applying the second electrical current to the second load, wherein the first requested amount of H2 and the second amount of H2 are different amounts, but a same proportionate amount of electricity is produced by the first mixed-gas fuel cell as for the second mixed-gas fuel cell.

Also described is [20], which is the method for controlling a sustainable energy delivery system according to [19], further comprising:

allocating to a first account associated with the first load and/or the first user terminal a first amount of carbon credit corresponding to the first requested amount of H2 on behalf of the first load; and allocating to a second account associated with the second load and/or the second user terminal a second amount of carbon credit corresponding to the second requested amount of H2 on behalf of the second load, wherein the carbon-based fuel has CH4 as a main component.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. A sustainable energy delivery system comprising:
a mixed-gas fuel cell configured to convert a mixed fuel fluid into electricity, the mixed fuel fluid including a majority of a carbon-based fuel and a minority of hydrogen (H2);
a system controller including control circuitry configured to produce a valve control command based on inputs aggregated from a plurality of user terminals;
a controllable valve configured to adjust an amount of H2 from a first pipeline that is added to the carbon-based fuel provided from a second pipeline in response to the valve control command;
a delivery pipeline that receives the mixed fuel fluid from the controllable valve and provides the mixed fuel fluid to the mixed-gas fuel cell;
an electrical conductor that conveys electricity produced by the mixed-gas fuel cell to a load, wherein
the system controller is configured to alter the valve control command based, at least in part, on a requested amount of H2 requested by a user terminal associated with the load, the user terminal being one of the plurality of user terminals.

2. The sustainable energy delivery system of claim 1, further comprising:
another mixed-gas fuel cell; and
another electrical conductor that conveys electricity produced by the another mixed-gas fuel cell to another load, wherein
the delivery pipeline includes
a first branch that connects to the mixed-gas fuel cell, and
a second branch that connect to the another mixed-gas fuel cell, the first branch being different than the second branch.

3. The sustainable energy delivery system of claim 1, wherein:
the system controller comprises a web server that is configured to serve a webpage, via an Internet, on a display of the user terminal that presents on the display a user-selectable H2 amount to be requested on behalf of the load.

4. The sustainable energy delivery system of claim 3, wherein:
the system controller is also configured to cause the webpage to present on the display of the user terminal a cost associated with a selected amount of H2.

5. The sustainable energy delivery system of claim 3, wherein:
the system controller is also configured to cause the webpage to present on the display of the user terminal an indication of a change in an amount of carbon dioxide (CO2) produced based on a selected amount of the user-selectable amount of H2 to be requested on behalf of the load.

6. The sustainable energy delivery system of claim 3, wherein:
the system controller is also configured to cause the webpage to present on the display an indication of an amount of carbon credit associated with a selected amount of the user-selectable amount of H2 to be requested on behalf of the load.

7. The sustainable energy delivery system of claim 1, wherein:
under a condition an aggregated amount of H2 requested by the plurality of user terminals exceeds a predetermined amount, the system controller is configured to set the valve control command to limit the amount of H2 to not exceed the predetermined amount.

8. The sustainable energy delivery system of claim 7, wherein the predetermined amount of H2 corresponds with a maximum H2 percentage the mixed-gas fuel cell is configured to accommodate.

9. The sustainable energy delivery system of claim 1, further comprising:
 a non-transitory computer readable medium having instructions stored therein that when executed by a mobile processor cause the mobile processor to run an application (APP) that provides on a display of the mobile processor a user-selectable H2 amount to be requested on behalf of the load, wherein the mobile processor being the user terminal.

10. The sustainable energy delivery system of claim 9, further comprising:
 the mobile processor, the mobile processor being one of a smartphone, a tablet computer, and a laptop computer, and
 the mobile processor includes a wireless transmitter that is configured to wirelessly transmit a request message to the system controller, the request message including an indication of the H2 amount requested on behalf of the load.

11. The sustainable energy delivery system of claim 1, further comprising:
 the user terminal, the user terminal having an account associated with the load, and including a user interface, a transceiver, and processing circuitry, the processing circuitry configured to
  generate a request signal in response to receiving H2 request information via the user interface, and
  transmit the request signal to the system controller, the request signal including an indication of the H2 amount requested by a user terminal.

12. The sustainable energy delivery system of claim 1, wherein:
 the carbon-based fuel has CH4 as a main component.

13. The sustainable energy delivery system of claim 2, wherein:
 the load is an electrical service for a first residence, and
 the another load is another electrical service for a different residence.

14. The sustainable energy delivery system of claim 1, wherein
 the system controller is configured to
 apply a trained AI engine to estimate an amount of H2 for the user terminal to request in order to offset, by a predetermined amount, CO2 emissions associated with an amount of the carbon-based fuel spent by the mixed-gas fuel cell to meet an electricity demand at the load, and
 simultaneously present on a display of the user terminal the estimate and a user-selectable H2 request interface that enables a user to request the requested amount of H2 for the load.

15. The sustainable energy delivery system of claim 1, wherein
 a proportion of electricity produced by the mixed-gas fuel cell for the load that is due to H2 and charged to an account for the first load is different than a proportion of H2 to carbon-based fuel to H2 that is output from the controllable valve.

\* \* \* \* \*